(12) United States Patent
Rachowin et al.

(10) Patent No.: US 12,051,045 B1
(45) Date of Patent: Jul. 30, 2024

(54) SYSTEMS AND METHODS TO CHARACTERIZE WORK UNIT RECORDS OF A COLLABORATION ENVIRONMENT BASED ON STAGES WITHIN A WORKFLOW

(71) Applicant: Asana, Inc., San Francisco, CA (US)

(72) Inventors: Lili Jiang Rachowin, San Francisco, CA (US); Eric Seth Pelz, San Francisco, CA (US); Micah Hanan Fenner, San Francisco, CA (US); John Joseph Welsh, San Francisco, CA (US); Shirley Yang, Oakland, CA (US); Michael Shengyang Chen, San Francisco, CA (US); Ariel Janover, Brooklyn, NY (US); Louis Benjamin Lafair, Berkeley, CA (US); Alexander Thomas Ryan, San Francisco, CA (US)

(73) Assignee: Asana, Inc., San Francisco, CA (US)

( * ) Notice: Subject to any disclaimer, the term of this patent is extended or adjusted under 35 U.S.C. 154(b) by 129 days.

(21) Appl. No.: 17/731,923

(22) Filed: Apr. 28, 2022

(51) Int. Cl.
G06Q 30/00 (2023.01)
G06F 3/0482 (2013.01)
G06Q 10/0633 (2023.01)
G06Q 10/10 (2023.01)

(52) U.S. Cl.
CPC ......... *G06Q 10/103* (2013.01); *G06F 3/0482* (2013.01); *G06Q 10/0633* (2013.01)

(58) Field of Classification Search
None
See application file for complete search history.

(56) References Cited

U.S. PATENT DOCUMENTS

| 5,233,687 | A | 8/1993 | Henderson, Jr. |
| 5,524,077 | A | 6/1996 | Faaland |
| 5,530,861 | A | 6/1996 | Diamant |
| 5,608,898 | A | 3/1997 | Turpin |
| 5,611,076 | A | 3/1997 | Durflinger |
| 5,623,404 | A | 4/1997 | Collins |
| 5,721,770 | A | 2/1998 | Kohler |
| 5,983,277 | A | 11/1999 | Heile |
| 6,024,093 | A | 2/2000 | Cron |

(Continued)

FOREIGN PATENT DOCUMENTS

| CN | 101305350 A | 11/2008 |
| CN | 101563671 A | 10/2009 |

(Continued)

OTHER PUBLICATIONS

"U.S. Appl. No. 14/584,750, Examiner Interview Summary mailed Feb. 25, 2016", 3 pgs.

(Continued)

*Primary Examiner* — Matthew T Sittner
(74) *Attorney, Agent, or Firm* — Esplin & Associates, PC

(57) ABSTRACT

Systems and methods to characterize work unit records of a collaboration environment based on stages within a workflow are described herein. Exemplary implementations may: manage environment state information maintaining a collaboration environment including work unit records; manage workflow information characterizing workflows comprising stages; responsive to work unit records being at individual stages, select the rules that apply at the individual stages; and/or perform other operations.

16 Claims, 4 Drawing Sheets

(56) References Cited

U.S. PATENT DOCUMENTS

| | | |
|---|---|---|
| 6,256,651 B1 | 7/2001 | Tuli |
| 6,292,830 B1 | 9/2001 | Taylor |
| 6,332,147 B1 | 12/2001 | Moran |
| 6,385,639 B1 | 5/2002 | Togawa |
| 6,621,505 B1 | 9/2003 | Beauchamp |
| 6,629,081 B1 | 9/2003 | Cornelius |
| 6,769,013 B2 | 7/2004 | Frees |
| 6,859,523 B1 | 2/2005 | Jilk |
| 7,020,697 B1 | 3/2006 | Goodman |
| 7,039,596 B1 | 5/2006 | Lu |
| 7,086,062 B1 | 8/2006 | Faour |
| 7,139,719 B1 | 11/2006 | Cherneff |
| 7,349,920 B1 | 3/2008 | Feinberg |
| 7,418,482 B1 | 8/2008 | Lusher |
| 7,428,723 B2 | 9/2008 | Greene |
| 7,640,511 B1 | 12/2009 | Keel |
| 7,676,542 B2 | 3/2010 | Moser |
| 7,779,039 B2 | 8/2010 | Weissman |
| 7,805,327 B1 | 9/2010 | Schulz |
| RE41,848 E | 10/2010 | Daniell |
| 7,917,855 B1 | 3/2011 | Satish |
| 7,996,744 B2 | 8/2011 | Ojala |
| 7,996,774 B1 | 8/2011 | Sidenur |
| 8,214,747 B1 | 7/2012 | Yankovich |
| 8,314,809 B1 | 11/2012 | Grabowski |
| 8,412,599 B2 * | 4/2013 | Saiu ............... G06Q 40/12 |
| | | 717/170 |
| 8,499,300 B2 | 7/2013 | Zimberg |
| 8,522,240 B1 | 8/2013 | Merwarth |
| 8,527,287 B1 | 9/2013 | Bhatia |
| 8,527,327 B1 | 9/2013 | Lawrence |
| 8,554,832 B1 | 10/2013 | Moskovitz |
| 8,572,477 B1 | 10/2013 | Moskovitz |
| 8,627,199 B1 | 1/2014 | Handley |
| 8,639,552 B1 | 1/2014 | Chen |
| 8,768,751 B2 | 7/2014 | Jakowski |
| 8,831,879 B2 | 9/2014 | Stamm |
| 8,843,832 B2 | 9/2014 | Frields |
| 8,863,021 B1 | 10/2014 | Bee |
| 9,009,096 B2 | 4/2015 | Pinckney |
| 9,024,752 B2 | 5/2015 | Tumayan |
| 9,143,839 B2 | 9/2015 | Reisman |
| 9,152,668 B1 | 10/2015 | Moskovitz |
| 9,201,952 B1 | 12/2015 | Chau |
| 9,208,262 B2 | 12/2015 | Bechtel |
| 9,251,484 B2 | 2/2016 | Cantor |
| 9,350,560 B2 | 5/2016 | Hupfer |
| 9,383,917 B2 | 7/2016 | Mouton |
| 9,405,532 B1 | 8/2016 | Sullivan |
| 9,405,810 B2 | 8/2016 | Smith |
| 9,454,623 B1 | 9/2016 | Kaptsan |
| 9,514,424 B2 | 12/2016 | Kleinbart |
| 9,552,226 B1 | 1/2017 | Norbeck, Jr. |
| 9,600,136 B1 | 3/2017 | Yang |
| 9,674,361 B2 | 6/2017 | Ristock |
| 9,712,576 B1 | 7/2017 | Gill |
| 9,785,445 B2 | 10/2017 | Mitsui |
| 9,830,398 B2 | 11/2017 | Schneider |
| 9,842,312 B1 | 12/2017 | Rosati |
| 9,949,681 B2 | 4/2018 | Badenes |
| 9,953,282 B2 | 4/2018 | Shaouy |
| 9,959,420 B2 | 5/2018 | Kiang |
| 9,978,040 B2 | 5/2018 | Lee |
| 9,990,636 B1 | 6/2018 | Lewis |
| 10,001,911 B2 | 6/2018 | Breedvelt-Schouten |
| 10,003,693 B2 | 6/2018 | Wolthuis |
| 10,083,412 B2 | 9/2018 | Suntinger |
| 10,157,355 B2 | 12/2018 | Johnson |
| 10,192,181 B2 | 1/2019 | Katkar |
| 10,235,156 B2 | 3/2019 | Johnson |
| 10,264,067 B2 | 4/2019 | Subramani |
| 10,282,405 B1 | 5/2019 | Silk |
| 10,308,992 B2 | 6/2019 | Chauvin |
| 10,373,084 B2 | 8/2019 | Kurjanowicz |
| 10,373,090 B2 | 8/2019 | Holm |
| 10,382,501 B2 | 8/2019 | Malatesha |
| 10,455,011 B2 | 10/2019 | Kendall |
| 10,496,943 B2 | 12/2019 | De |
| 10,594,788 B2 | 3/2020 | Larabie-Belanger |
| 10,606,859 B2 | 3/2020 | Smith |
| 10,613,735 B1 | 4/2020 | Karpe |
| 10,616,151 B1 | 4/2020 | Cameron |
| 10,623,359 B1 | 4/2020 | Rosenstein |
| 10,671,692 B2 | 6/2020 | Koopman |
| 10,684,870 B1 | 6/2020 | Sabo |
| 10,706,484 B1 | 7/2020 | Murnock |
| 10,785,046 B1 | 9/2020 | Raghavan |
| 10,810,222 B2 | 10/2020 | Koch |
| 10,846,105 B2 | 11/2020 | Granot |
| 10,846,297 B2 | 11/2020 | Smith |
| 10,922,104 B2 | 2/2021 | Sabo |
| 10,956,845 B1 | 3/2021 | Sabo |
| 10,970,299 B2 | 4/2021 | Smith |
| 10,977,434 B2 | 4/2021 | Pelz |
| 10,983,685 B2 | 4/2021 | Karpe |
| 11,082,281 B2 | 8/2021 | Rosenstein |
| 11,095,468 B1 | 8/2021 | Pandey |
| 11,113,667 B1 | 9/2021 | Jiang |
| 11,121,996 B2 | 9/2021 | Chen |
| 11,138,021 B1 | 10/2021 | Rosenstein |
| 11,140,174 B2 | 10/2021 | Patel |
| 11,204,683 B1 | 12/2021 | Sabo |
| 11,212,242 B2 | 12/2021 | Cameron |
| 11,263,228 B2 | 3/2022 | Koch |
| 11,288,081 B2 | 3/2022 | Sabo |
| 11,290,296 B2 | 3/2022 | Raghavan |
| 11,327,645 B2 | 5/2022 | Karpe |
| 11,341,444 B2 | 5/2022 | Sabo |
| 11,341,445 B1 | 5/2022 | Cheng |
| 2002/0065798 A1 | 5/2002 | Bostleman |
| 2002/0082889 A1 | 6/2002 | Oliver |
| 2002/0099679 A1 * | 7/2002 | Usitalo ............... G06N 5/00 |
| | | 706/46 |
| 2002/0143594 A1 | 10/2002 | Kroeger |
| 2003/0028595 A1 | 2/2003 | Vogt |
| 2003/0036934 A1 | 2/2003 | Ouchi |
| 2003/0041317 A1 | 2/2003 | Sokolov |
| 2003/0097406 A1 | 5/2003 | Stafford |
| 2003/0097410 A1 | 5/2003 | Atkins |
| 2003/0126001 A1 | 7/2003 | Northcutt |
| 2003/0200223 A1 | 10/2003 | Hack |
| 2003/0225598 A1 | 12/2003 | Yu |
| 2003/0233265 A1 | 12/2003 | Lee |
| 2003/0233268 A1 | 12/2003 | Taqbeem |
| 2004/0083448 A1 | 4/2004 | Schulz |
| 2004/0093290 A1 | 5/2004 | Doss |
| 2004/0093351 A1 | 5/2004 | Lee |
| 2004/0098291 A1 | 5/2004 | Newburn |
| 2004/0125150 A1 | 7/2004 | Adcock |
| 2004/0162833 A1 | 8/2004 | Jones |
| 2004/0187089 A1 | 9/2004 | Schulz |
| 2004/0207249 A1 | 10/2004 | Baumgartner |
| 2004/0230447 A1 | 11/2004 | Schwerin-Wenzel |
| 2004/0268451 A1 | 12/2004 | Robbin |
| 2005/0210394 A1 | 9/2005 | Crandall |
| 2005/0216111 A1 | 9/2005 | Ooshima |
| 2005/0222971 A1 | 10/2005 | Cary |
| 2006/0028917 A1 | 2/2006 | Wigginton |
| 2006/0047454 A1 | 3/2006 | Tamaki |
| 2006/0085245 A1 | 4/2006 | Takatsuka |
| 2006/0095859 A1 | 5/2006 | Bocking |
| 2006/0136441 A1 | 6/2006 | Fujisaki |
| 2006/0143270 A1 | 6/2006 | Wodtke |
| 2006/0167736 A1 | 7/2006 | Weiss |
| 2006/0190391 A1 | 8/2006 | Cullen, III |
| 2006/0200264 A1 | 9/2006 | Kodama |
| 2006/0218551 A1 | 9/2006 | Berstis |
| 2006/0224430 A1 | 10/2006 | Butt |
| 2006/0277487 A1 | 12/2006 | Poulsen |
| 2007/0016646 A1 | 1/2007 | Tendjoukian |
| 2007/0025567 A1 | 2/2007 | Fehr |
| 2007/0038494 A1 | 2/2007 | Kreitzberg |
| 2007/0041542 A1 | 2/2007 | Schramm |
| 2007/0050225 A1 | 3/2007 | Leslie |

(56) References Cited

U.S. PATENT DOCUMENTS

| | | |
|---|---|---|
| 2007/0073575 A1 | 3/2007 | Yomogida |
| 2007/0143169 A1 | 6/2007 | Grant |
| 2007/0147178 A1 | 6/2007 | Masuda |
| 2007/0150327 A1 | 6/2007 | Dromgold |
| 2007/0232278 A1 | 10/2007 | May |
| 2007/0239725 A1 | 10/2007 | Bhat |
| 2007/0255674 A1 | 11/2007 | Mahoney |
| 2007/0255715 A1 | 11/2007 | Li |
| 2007/0260499 A1 | 11/2007 | Greef |
| 2007/0288283 A1 | 12/2007 | Fitzpatrick |
| 2007/0294344 A1 | 12/2007 | Mohan |
| 2008/0033777 A1 | 2/2008 | Shukoor |
| 2008/0046471 A1 | 2/2008 | Moore |
| 2008/0079730 A1 | 4/2008 | Zhang |
| 2008/0082389 A1 | 4/2008 | Gura |
| 2008/0082956 A1 | 4/2008 | Gura |
| 2008/0091782 A1 | 4/2008 | Jakobson |
| 2008/0120129 A1 | 5/2008 | Seubert |
| 2008/0126930 A1 | 5/2008 | Scott |
| 2008/0134069 A1 | 6/2008 | Horvitz |
| 2008/0155547 A1 | 6/2008 | Weber |
| 2008/0158023 A1 | 7/2008 | Chung |
| 2008/0167937 A1 | 7/2008 | Coughlin |
| 2008/0175104 A1 | 7/2008 | Grieb |
| 2008/0195964 A1 | 8/2008 | Randell |
| 2008/0221946 A1 | 9/2008 | Balon |
| 2008/0222566 A1 | 9/2008 | Daughtrey |
| 2008/0244582 A1 | 10/2008 | Brown |
| 2008/0268876 A1 | 10/2008 | Gelfand |
| 2008/0270198 A1 | 10/2008 | Graves |
| 2008/0281665 A1 | 11/2008 | Opaluch |
| 2008/0313004 A1 | 12/2008 | Ryan |
| 2009/0048986 A1 | 2/2009 | Anderson |
| 2009/0055796 A1 | 2/2009 | Springborn |
| 2009/0076878 A1 | 3/2009 | Woerner |
| 2009/0089133 A1 | 4/2009 | Johnson |
| 2009/0094623 A1 | 4/2009 | Chakra |
| 2009/0113310 A1 | 4/2009 | Appleyard |
| 2009/0133027 A1 | 5/2009 | Gunning |
| 2009/0167553 A1 | 7/2009 | Hong |
| 2009/0187454 A1 | 7/2009 | Khasin |
| 2009/0199192 A1 | 8/2009 | Laithwaite |
| 2009/0204463 A1 | 8/2009 | Burnett |
| 2009/0204471 A1 | 8/2009 | Elenbaas |
| 2009/0234699 A1 | 9/2009 | Steinglass |
| 2009/0241053 A1 | 9/2009 | Augustine |
| 2009/0260010 A1 | 10/2009 | Burkhart |
| 2009/0287523 A1 | 11/2009 | Lau |
| 2009/0296908 A1 | 12/2009 | Lee |
| 2009/0299803 A1 | 12/2009 | Lakritz |
| 2009/0307319 A1 | 12/2009 | Dholakia |
| 2010/0005087 A1 | 1/2010 | Basco |
| 2010/0070888 A1 | 3/2010 | Watabe |
| 2010/0088137 A1 | 4/2010 | Weiss |
| 2010/0106627 A1 | 4/2010 | O'Sullivan |
| 2010/0114786 A1 | 5/2010 | Aboujaoude |
| 2010/0115523 A1 | 5/2010 | Kuschel |
| 2010/0122334 A1 | 5/2010 | Stanzione |
| 2010/0131860 A1 | 5/2010 | Dehaan |
| 2010/0145801 A1 | 6/2010 | Chekuri |
| 2010/0169146 A1 | 7/2010 | Hoyne |
| 2010/0169802 A1 | 7/2010 | Goldstein |
| 2010/0180212 A1 | 7/2010 | Gingras |
| 2010/0223575 A1 | 9/2010 | Leukart |
| 2010/0269049 A1 | 10/2010 | Fearon |
| 2010/0299171 A1 | 11/2010 | Lau |
| 2010/0312605 A1 | 12/2010 | Mitchell |
| 2010/0313151 A1 | 12/2010 | Wei |
| 2011/0015961 A1 | 1/2011 | Chan |
| 2011/0022662 A1 | 1/2011 | Barber-Mingo |
| 2011/0054968 A1 | 3/2011 | Galaviz |
| 2011/0055177 A1 | 3/2011 | Chakra |
| 2011/0060720 A1 | 3/2011 | Devereux |
| 2011/0071878 A1 | 3/2011 | Gingras |
| 2011/0071893 A1 | 3/2011 | Malhotra |
| 2011/0072372 A1 | 3/2011 | Fritzley |
| 2011/0093538 A1 | 4/2011 | Weir |
| 2011/0093619 A1 | 4/2011 | Nelson |
| 2011/0113365 A1 | 5/2011 | Kimmerly |
| 2011/0154216 A1 | 6/2011 | Aritsuka |
| 2011/0161128 A1 | 6/2011 | Barney |
| 2011/0184768 A1 | 7/2011 | Norton |
| 2011/0270644 A1 | 11/2011 | Roncolato |
| 2011/0307100 A1 | 12/2011 | Schmidtke |
| 2011/0307772 A1 | 12/2011 | Lloyd |
| 2012/0030194 A1 | 2/2012 | Jain |
| 2012/0035942 A1 | 2/2012 | Graupner |
| 2012/0066030 A1 | 3/2012 | Limpert |
| 2012/0066411 A1 | 3/2012 | Jeide |
| 2012/0072251 A1 | 3/2012 | Mircean |
| 2012/0079449 A1 | 3/2012 | Sanderson |
| 2012/0110087 A1 | 5/2012 | Culver |
| 2012/0117499 A1 | 5/2012 | Mori |
| 2012/0123835 A1 | 5/2012 | Chu |
| 2012/0131191 A1* | 5/2012 | May .................. G06Q 10/10 709/226 |
| 2012/0158946 A1 | 6/2012 | Shafiee |
| 2012/0192086 A1 | 7/2012 | Ghods |
| 2012/0221963 A1 | 8/2012 | Motoyama |
| 2012/0239451 A1 | 9/2012 | Caligor |
| 2012/0254218 A1 | 10/2012 | Ali |
| 2012/0266068 A1 | 10/2012 | Ryman |
| 2012/0278388 A1 | 11/2012 | Kleinbart |
| 2012/0296993 A1 | 11/2012 | Heyman |
| 2012/0304187 A1 | 11/2012 | Maresh |
| 2012/0317108 A1 | 12/2012 | Okazaki |
| 2013/0007332 A1 | 1/2013 | Teh |
| 2013/0013560 A1 | 1/2013 | Goldberg |
| 2013/0014023 A1 | 1/2013 | Lee |
| 2013/0018688 A1 | 1/2013 | Nudd |
| 2013/0021629 A1 | 1/2013 | Kurilin |
| 2013/0066944 A1 | 3/2013 | Laredo |
| 2013/0067375 A1 | 3/2013 | Kim |
| 2013/0067549 A1 | 3/2013 | Caldwell |
| 2013/0073328 A1 | 3/2013 | Ehrler |
| 2013/0103412 A1 | 4/2013 | Nudd |
| 2013/0124638 A1 | 5/2013 | Barreto |
| 2013/0151421 A1 | 6/2013 | Van Der Ploeg |
| 2013/0151604 A1 | 6/2013 | Ranade |
| 2013/0173486 A1 | 7/2013 | Peters |
| 2013/0179208 A1 | 7/2013 | Chung |
| 2013/0179799 A1 | 7/2013 | Savage |
| 2013/0215116 A1 | 8/2013 | Siddique |
| 2013/0227007 A1 | 8/2013 | Savage |
| 2013/0246110 A1 | 9/2013 | Nakhayi Ashtiani |
| 2013/0246399 A1 | 9/2013 | Schneider |
| 2013/0275229 A1 | 10/2013 | Moganti |
| 2013/0279685 A1 | 10/2013 | Kohler |
| 2013/0317871 A1 | 11/2013 | Kulkarni |
| 2013/0321467 A1 | 12/2013 | Tappen |
| 2013/0339099 A1 | 12/2013 | Aidroos |
| 2013/0339831 A1 | 12/2013 | Gulanikar |
| 2014/0007005 A1 | 1/2014 | Libin |
| 2014/0012603 A1 | 1/2014 | Scanlon |
| 2014/0025767 A1 | 1/2014 | De Kezel |
| 2014/0036639 A1 | 2/2014 | Boni |
| 2014/0040780 A1 | 2/2014 | Artzt |
| 2014/0040905 A1 | 2/2014 | Tadanobu |
| 2014/0058801 A1 | 2/2014 | Deodhar |
| 2014/0059910 A1 | 3/2014 | Norton |
| 2014/0074536 A1 | 3/2014 | Meushar |
| 2014/0089719 A1 | 3/2014 | Daum |
| 2014/0101310 A1 | 4/2014 | Savage |
| 2014/0156539 A1 | 6/2014 | Brunet |
| 2014/0165001 A1 | 6/2014 | Shapiro |
| 2014/0172478 A1 | 6/2014 | Vadasz |
| 2014/0189017 A1 | 7/2014 | Prakash |
| 2014/0200944 A1 | 7/2014 | Henriksen |
| 2014/0208325 A1 | 7/2014 | Chen |
| 2014/0215344 A1 | 7/2014 | Ligman |
| 2014/0229609 A1 | 8/2014 | Wong |
| 2014/0236663 A1 | 8/2014 | Smith |
| 2014/0244334 A1 | 8/2014 | De |
| 2014/0257894 A1 | 9/2014 | Melahn |

(56) References Cited

U.S. PATENT DOCUMENTS

| | | |
|---|---|---|
| 2014/0279294 A1 | 9/2014 | Field-Darragh |
| 2014/0288987 A1 | 9/2014 | Liu |
| 2014/0310047 A1 | 10/2014 | De |
| 2014/0310051 A1 | 10/2014 | Meng |
| 2014/0350997 A1 | 11/2014 | Holm |
| 2014/0364987 A1 | 12/2014 | Shikano |
| 2015/0006448 A1 | 1/2015 | Gupta |
| 2015/0007058 A1 | 1/2015 | Wooten |
| 2015/0012324 A1 | 1/2015 | Lance |
| 2015/0012330 A1 | 1/2015 | Sugiura |
| 2015/0052437 A1 | 2/2015 | Crawford |
| 2015/0058053 A1 | 2/2015 | De |
| 2015/0113540 A1 | 4/2015 | Rabinovici |
| 2015/0134393 A1 | 5/2015 | De |
| 2015/0153906 A1 | 6/2015 | Liao |
| 2015/0213411 A1 | 7/2015 | Swanson |
| 2015/0215256 A1 | 7/2015 | Ghafourifar |
| 2015/0262111 A1 | 9/2015 | Yu |
| 2015/0286990 A1 | 10/2015 | Adair |
| 2015/0312375 A1 | 10/2015 | Valey |
| 2015/0317595 A1 | 11/2015 | De |
| 2015/0339006 A1 | 11/2015 | Chaland |
| 2015/0363092 A1 | 12/2015 | Morton |
| 2015/0363733 A1 | 12/2015 | Brown |
| 2015/0379472 A1 | 12/2015 | Gilmour |
| 2016/0012368 A1 | 1/2016 | O'Connell |
| 2016/0048408 A1 | 2/2016 | Madhu |
| 2016/0048786 A1 | 2/2016 | Fukuda |
| 2016/0063192 A1 | 3/2016 | Johnson |
| 2016/0063449 A1 | 3/2016 | Duggan |
| 2016/0072750 A1 | 3/2016 | Kass |
| 2016/0110670 A1 | 4/2016 | Chatterjee |
| 2016/0124775 A1 | 5/2016 | Ashtiani |
| 2016/0140474 A1 | 5/2016 | Vekker |
| 2016/0140501 A1 | 5/2016 | Figlin |
| 2016/0147773 A1 | 5/2016 | Smith |
| 2016/0147846 A1 | 5/2016 | Smith |
| 2016/0148157 A1 | 5/2016 | Walia |
| 2016/0180277 A1 | 6/2016 | Skiba |
| 2016/0180298 A1 | 6/2016 | McClement |
| 2016/0182311 A1 | 6/2016 | Borna |
| 2016/0188145 A1 | 6/2016 | Vida |
| 2016/0216854 A1 | 7/2016 | McClellan |
| 2016/0224939 A1 | 8/2016 | Chen |
| 2016/0234391 A1 | 8/2016 | Wolthuis |
| 2016/0275436 A1 | 9/2016 | Kurjanowicz |
| 2016/0313934 A1 | 10/2016 | Isherwood |
| 2016/0328217 A1 | 11/2016 | Hagerty |
| 2016/0342927 A1 | 11/2016 | Reznik |
| 2017/0004213 A1 | 1/2017 | Cunico |
| 2017/0009387 A1 | 1/2017 | Ge |
| 2017/0017364 A1 | 1/2017 | Kekki |
| 2017/0017924 A1 | 1/2017 | Kashiwagi |
| 2017/0039503 A1 | 2/2017 | Jones |
| 2017/0061341 A1 | 3/2017 | Haas |
| 2017/0068933 A1 | 3/2017 | Norton |
| 2017/0093874 A1 | 3/2017 | Uthe |
| 2017/0099296 A1 | 4/2017 | Fisher |
| 2017/0103369 A1 | 4/2017 | Thompson |
| 2017/0116552 A1 | 4/2017 | Deodhar |
| 2017/0132200 A1 | 5/2017 | Noland |
| 2017/0140310 A1* | 5/2017 | Gottemukkala ....... G06Q 50/01 |
| 2017/0147960 A1 | 5/2017 | Jahagirdar |
| 2017/0153799 A1 | 6/2017 | Hoyer |
| 2017/0154024 A1 | 6/2017 | Subramanya |
| 2017/0177671 A1 | 6/2017 | Allgaier |
| 2017/0185592 A1 | 6/2017 | Frei |
| 2017/0192642 A1 | 7/2017 | Fishman |
| 2017/0206217 A1 | 7/2017 | Deshpande |
| 2017/0249577 A1 | 8/2017 | Nishikawa |
| 2017/0316367 A1 | 11/2017 | Candito |
| 2017/0317898 A1 | 11/2017 | Candito |
| 2017/0323233 A1 | 11/2017 | Bencke |
| 2017/0323267 A1 | 11/2017 | Baek |
| 2017/0323350 A1 | 11/2017 | Laderer |
| 2017/0344754 A1 | 11/2017 | Kumar |
| 2017/0346861 A1 | 11/2017 | Pearl |
| 2017/0351385 A1 | 12/2017 | Ertmann |
| 2018/0032524 A1 | 2/2018 | Byron |
| 2018/0052943 A1 | 2/2018 | Hui |
| 2018/0053127 A1 | 2/2018 | Boileau |
| 2018/0059910 A1 | 3/2018 | Wooten |
| 2018/0060785 A1 | 3/2018 | Carnevale |
| 2018/0060818 A1 | 3/2018 | Ishiyama |
| 2018/0063063 A1 | 3/2018 | Yan |
| 2018/0068271 A1 | 3/2018 | Abebe |
| 2018/0075387 A1 | 3/2018 | Kulkarni |
| 2018/0075413 A1 | 3/2018 | Culver |
| 2018/0083792 A1 | 3/2018 | Wanderski |
| 2018/0088754 A1 | 3/2018 | Psenka |
| 2018/0089625 A1 | 3/2018 | Rosati |
| 2018/0095938 A1 | 4/2018 | Monte |
| 2018/0102989 A1 | 4/2018 | Borsutsky |
| 2018/0131649 A1 | 5/2018 | Ma |
| 2018/0157477 A1 | 6/2018 | Johnson |
| 2018/0165610 A1 | 6/2018 | Dumant |
| 2018/0173386 A1 | 6/2018 | Adika |
| 2018/0189706 A1 | 7/2018 | Newhouse |
| 2018/0189736 A1 | 7/2018 | Guo |
| 2018/0225795 A1 | 8/2018 | Napoli |
| 2018/0247352 A1 | 8/2018 | Rogers |
| 2018/0260081 A1 | 9/2018 | Beaudoin |
| 2018/0262620 A1 | 9/2018 | Wolthuis |
| 2018/0285471 A1 | 10/2018 | Hao |
| 2018/0316636 A1 | 11/2018 | Kamat |
| 2018/0331842 A1 | 11/2018 | Faulkner |
| 2018/0341928 A1 | 11/2018 | Khan |
| 2018/0357049 A1 | 12/2018 | Epstein |
| 2018/0367477 A1 | 12/2018 | Hariram |
| 2018/0367483 A1 | 12/2018 | Rodriguez |
| 2018/0373804 A1 | 12/2018 | Zhang |
| 2019/0005048 A1 | 1/2019 | Crivello |
| 2019/0014070 A1 | 1/2019 | Mertvetsov |
| 2019/0018552 A1 | 1/2019 | Bloy |
| 2019/0034057 A1 | 1/2019 | Rudchenko |
| 2019/0068390 A1 | 2/2019 | Gross |
| 2019/0079909 A1 | 3/2019 | Purandare |
| 2019/0080289 A1 | 3/2019 | Kreitler |
| 2019/0095839 A1 | 3/2019 | Itabayashi |
| 2019/0095846 A1 | 3/2019 | Gupta |
| 2019/0102700 A1 | 4/2019 | Babu |
| 2019/0138583 A1 | 5/2019 | Silk |
| 2019/0138589 A1 | 5/2019 | Udell |
| 2019/0138961 A1 | 5/2019 | Santiago |
| 2019/0139004 A1 | 5/2019 | Vukovic |
| 2019/0147386 A1 | 5/2019 | Balakrishna |
| 2019/0187987 A1 | 6/2019 | Fauchère |
| 2019/0213509 A1 | 7/2019 | Burleson |
| 2019/0236516 A1 | 8/2019 | Ponnusamy |
| 2019/0265821 A1 | 8/2019 | Pearl |
| 2019/0340296 A1 | 11/2019 | Cunico |
| 2019/0340574 A1 | 11/2019 | Ekambaram |
| 2019/0347094 A1 | 11/2019 | Sullivan |
| 2019/0347126 A1 | 11/2019 | Bhandari |
| 2019/0370320 A1 | 12/2019 | Kalra |
| 2020/0019907 A1 | 1/2020 | Notani |
| 2020/0059539 A1 | 2/2020 | Wang |
| 2020/0065736 A1 | 2/2020 | Relangi |
| 2020/0162315 A1 | 5/2020 | Siddiqi |
| 2020/0192538 A1 | 6/2020 | Karpe |
| 2020/0192908 A1 | 6/2020 | Smith |
| 2020/0193756 A1 | 6/2020 | Jin |
| 2020/0218551 A1 | 7/2020 | Sabo |
| 2020/0228474 A1 | 7/2020 | Cameron |
| 2020/0233879 A1 | 7/2020 | Papanicolaou |
| 2020/0244611 A1 | 7/2020 | Rosenstein |
| 2020/0328906 A1 | 10/2020 | Raghavan |
| 2020/0344253 A1 | 10/2020 | Kurup |
| 2021/0004380 A1 | 1/2021 | Koch |
| 2021/0004381 A1 | 1/2021 | Smith |
| 2021/0097466 A1 | 4/2021 | Sabo |
| 2021/0103451 A1 | 4/2021 | Sabo |
| 2021/0110347 A1 | 4/2021 | Khalil |
| 2021/0136012 A1 | 5/2021 | Barbitta |

(56) References Cited

U.S. PATENT DOCUMENTS

| | | |
|---|---|---|
| 2021/0182475 A1 | 6/2021 | Pelz |
| 2021/0216562 A1 | 7/2021 | Smith |
| 2021/0232282 A1 | 7/2021 | Karpe |
| 2021/0320891 A1 | 10/2021 | Rosenstein |
| 2021/0342786 A1 | 11/2021 | Jiang |
| 2021/0382734 A1 | 12/2021 | Rosenstein |
| 2022/0019320 A1 | 1/2022 | Sabo |
| 2022/0058548 A1 | 2/2022 | Garg |
| 2022/0075792 A1 | 3/2022 | Koch |
| 2022/0078142 A1 | 3/2022 | Cameron |
| 2022/0158859 A1 | 5/2022 | Raghavan |
| 2022/0294753 A1 | 9/2022 | Rosenstein |
| 2023/0308409 A1 | 9/2023 | Rosenstein |

FOREIGN PATENT DOCUMENTS

| | | |
|---|---|---|
| CN | 102378975 B | 5/2015 |
| WO | 2015036817 A1 | 3/2015 |
| WO | 2015123751 A1 | 8/2015 |
| WO | 2016099586 A1 | 6/2016 |
| WO | 2020006634 A1 | 1/2020 |

OTHER PUBLICATIONS

"U.S. Appl. No. 14/584,750, Non Final Office Action mailed Aug. 28, 2015", 21 pgs.

"U.S. Appl. No. 14/584,750, Notice of Allowance mailed Mar. 28, 2016", 8 pgs.

"U.S. Appl. No. 14/584,750, Response filed Feb. 29, 2015 to Non Final Office Action mailed Aug. 28, 2015", 16 pgs.

"U.S. Appl. No. 14/584,850, Final Office Action mailed Sep. 1, 2017", 31 pgs.

"U.S. Appl. No. 14/584,850, Non Final Office Action mailed Jan. 10, 2017", 9 pgs.

"U.S. Appl. No. 14/584,850, Response filed Apr. 10, 2017 to Non Final Office Action mailed Jan. 10, 2017", 13 pgs.

"How to Asana: Inviting teammates to Asana." YouTube, Asana, Mar. 21, 2017, https://www.youtube.com/watch?v=TLOruY1KyxU ( Year: 2017), 13 pages.

"Rules of Data Conversion from Document to Relational Databases", published: 2014, publisher: Future-processing, pp. 1-8 (Year: 2014).

(Tiburca, Andrew) Best Team Calendar Applications for 2018-Toggl https://toggl.com/blog/best-team- calendar-applications-for-2018 (Year: 2017).

Asana Demo and Product Tour, you tube excerpt, Dec. 7, 2017 https://www.youtube.com/watch?v=IMAFWVLGFyw (Year: 2017) (16 pages).

Asana integrations, Asana tutorial, youtube, excerpt, Nov. 16, 2016 https://www.youtube.com/watch?v=hBiQ7DJNinE (Year: 2016) (21 pages).

Asana Workload and Portfolios, youtube, excerpt, Aug. 1, 2019 https://www.youtube.com/watch?v=7XkNcfFDG6M (Year: 2019) (20 pages).

Asana YouTube channel, list of all product videos, Nov. 19, 2014-Aug. 19, 2019 https://www.youtube.com/user/AsanaTeam/videos?disable_polymer=1 (Year: 2019) (5 pages).

Asana, Task dependencies, archives org, Aug. 25, 2017 https://web.archive.org/web/20170825002141/https://asana.com/guide/help/tasks/dependencies (Year: 2017) (5 pages).

Asana, Manage your team capacity with Workload, youtube, excerpt, Aug. 1, 2019 https://www.youtube.com/watch?v=2ufXyZDzZnA&list=PLJFG93oi0wJAi UwyOhIGWHdtJzJrzyIBv (Year: 2019) (1 page).

Assef, F., Cassius, T. S., & Maria, T. S. (2018). Confrontation between techniques of time measurement. Journal of Manufacturing Technology Management, 29(5), 789-810. (Year: 2018).

Biggs, "GateGuru Relaunches With New Ways to Streamline Your Travel Experience", Techcrunch, (Apr. 26, 2013), 3 pgs.

Castaneda Samuel, Introduction Manual—Asana, Sep. 25, 2017 https://static1.squarespace.com/static/586d532ae58c6232db243a65/t/5c210c10f950b7fc7a8e3274/1545669658049/Asana+Manual.pdf (Year: 2017) (20 pages).

Command and control, wikipedia, archives org, Mar. 16, 2018 https://web.archive.org/web/20180316193655/https://en.wikipedia.org/wiki/Command_and_control (Year: 2018), 6 pages.

Creating Tables with Fields from 2 Different Tables, published: 2009, publisher: StackOverflow, pp. 1-2. (Year: 2009).

Critical chain project management, Wikipedia, archives org, Dec. 17, 2016 https://web.archive.Org/web/20161217090326/https://en.wikipedia.org/wiki/Critical_chain_project_management (Year: 2016) 5 pages.

Critical Path Method, Wikipedia, archives org, Sep. 19, 2017 https://web.archive.Org/web/20170919223814/https://en.wikipedia.org/wiki/Critical_path_method (Year: 2017) 6 pages.

Dawei Li, "Deepcham: Collaborative Edge-Mediated Adaptive Deep Learning for Mobile Object Recognition", 2016, IEEE/ACM, pp. 64-76. (Year: 2016).

Fruhlinger, Joshua. "The Best To-Do ListApps for Feeling Productive; With the right app, feeling productive can be just as gratifying as actually getting things done" Wall Street Journal (Online); New York, N.Y. [New York, N.Y]Nov. 8, 2013 (Year: 2013) 4 pages.

Hartmann, "TimeProjectscheduling with resource capacities and requests varying with time: a case study," 2013, Flexible services and manufacturing journal, vol. 25, No. 1, pp. 74-93 (Year: 2013).

Helen Mongan-Rallis & Terrie Shannon, "Synchronous Chat," Aug. 2016, Dept. of Education, Univ. of MN Duluth, web.archive.org/web/20160825183503/https://www.d.umn.edu/hrallis/professional/presentations/cotfsp06/indiv_tools/sync_chat.htm (Year: 2016) (2 pages).

How to Asana Asana time tracking, youtube, excerpt, May 24, 2017 https://www.youtube.com/watch?v=z91qlex-TLc (Year: 2017) (1 page).

How to Asana, Asana project management, youtube, excerpt, Mar. 7, 2017 https://www.youtube.com/watch?v=qqANMTvVpE (Year: 2017) (28 pages).

How to Asana, Creating your first Asana project, youtube, excerpt, Jan. 31, 2017 https://www.youtube.com/watch?v=L04WmcUdsLo (Year: 2017) (1 page).

How to Asana, Getting Asana into your workflow, youtube, excerpt, Jul. 17, 2017 https://www.youtube.com/watch?v=7YLrNMdv3o (Year: 2017) (24 pages).

How to Asana, Planning with Asana calendar, youtube excerpt, Feb. 14, 2017 https://www.youtube.com/watch?v=w816KYiVPyc (Year: 2017) (19 pages).

How to Asana, Using Asana for task management, youtube, excerpt, Feb. 7, 2017 https://www.youtube.com/watch?v=vwvbgiejhQ (Year: 2017) (8 pages).

How to Asana, Visualizing work with Asana kanban boards, youtube, excerpt, Feb. 21, 2017 https://www.youtube.com/watch?v=jmZaZGydfPY (Year: 2017) (41 pages).

How to Asana, Workflow management, youtube, excerpt, May 30, 2017 https://www.youtube.com/watch?v=rk8nPWmXsRo (Year: 2017) (9 pages).

How to use Advanced Search in Asana, Asana tutorial, May 25, 2016 https://www.youtube.com/watch?v=5VyJ3toPfQM (Year: 2016) (28 pages).

Justin Rosenstein, Unveiling the Future of Asana, Mar. 28, 2018 https://www.youtube.com/watch?v=nRI?d_WM4Bc (Year: 2018) (2 pages).

Lauren Labrecque, "Fostering Consumer-Brand Relationships in Social Media Environments: The Role of Parasocial Interaction", 2014, Journal of Interactive Markeing, 28 (2014), pp. 134-148 (Year: 2014).

Macro, computer science, wikipedia, archives org, 6 pages, Feb. 11, 2020 http://web.archive.org/web/20200211082902/https://en.wikipedia.org/wiki/Macro_(computer_science) (Year: 2020).

Mauricio Aizawa, Zapier, How to Automate Asana Tasks creation using Evernote, youtube excerpts, Mar. 16, 2018 https://www.youtube.com/watch?v=BjDQ4Gny4WI (Year: 2018) (8 pages).

Paul Minors, How to automate your tasks, youtube excerpts, Oct. 18, 2019 https://www.youtube.com/watch?v=IwF9XyUQrzw (Year: 2019).

(56) References Cited

OTHER PUBLICATIONS

Prioritize My Tasks in Asana, Asana tutorial, youtube, excerpt, May 25, 2016 https://www.youtube.com/watch?v=UbCnMvw01nl (Year: 2016) (3 pages).

Project views, Asana tutorial, youtube, excerpt May 25, 2016 https://www.youtube.com/watch?v=FYjA8ZH3ceQ (Year: 2016) (5 pages).

Using Asana Premium, Asana tutorial, youtube, excerpt, Sep. 10, 2016 https://www.youtube.com/watch?v=vMgLtDDmyeo (Year: 2016) (4 pages).

Where does Asana fit in, archives org, Jul. 8, 2017 https://web.archive.org/web/20170708150928/https://asana.com/guide/resources/infosheets/where-does-asana-fit (Year: 2017) (5 pages).

Wix.com, How to Use Wix Code with Marketing Tools to Create Custom Events, Oct. 18, 2018, YouTube, https://www.youtube.com/watch?v=MTBVykOYGvO&feature=emb_title, 2 pages.

www.asana.com (as retrieved from https://web.archive.Org/web/20160101054536/https://asana.com/press and https://web.archive.org/web/20160101054527/https://asana.com/product) (Year: 2016) 15 pages.

www.cogmotive.com/blog/author/alan Alan Byrne: "Creating a company Shared Calendar in Office 365"; pp. 1-17; Sep. 10, 2013 (16 pages).

L. Wu and H. Sahraoui, "Accommodating software development collaboration," 12th Asia-Pacific Software Engineering Conference (APSEC'05), Taipei, Taiwan, 2005, pp. 8 pp.-, doi: 10.1109/APSEC.2005.23. (Year: 2005).

\* cited by examiner

SYSTEMS AND METHODS TO CHARACTERIZE WORK UNIT RECORDS OF A COLLABORATION ENVIRONMENT BASED ON STAGES WITHIN A WORKFLOW

FIELD OF THE DISCLOSURE

The present disclosure relates to systems and methods to characterize work unit records of a collaboration environment based on stages within a workflow, in particular, using the stage characterizations as a mechanism to automate management of the records as they progress through the stages of the workflow.

BACKGROUND

Web-based collaboration environments, sometimes referred to as work management platforms, may enable users to assign projects, tasks, or other assignments to assignees (e.g., other users) to complete. A collaboration environment may comprise an environment in which individual users and/or a virtual team of users does its work and enables the users to work in a more organized and efficient manner when remotely located from each other.

SUMMARY

Hosting a web-based collaboration environment poses many challenges. For example, operating the collaboration environment may require precise ways of creation, storage, management, and/or provision of information that makes up the collaboration environment. One way that operators look to improve the operation of the collaboration environment is to improve parts of the collaboration environment involving substantial human-machine interaction. For example, work unit records may be defined with custom or pre-defined fields, sometimes called "tags," that assist users in the organization of the work unit records. By way of non-limiting illustration, work unit records may be used in connection with an ongoing, orchestrated, process of work (referred to herein as a "workflow"). As a work unit record progresses through the work process, a user may change or add tags (or other information defined by the record) as an indicator of where they are in their work process. The progression through the workflow may be organized based on some reference material, which may dictate how the work should progress through the work process. The reference material may comprise, for example, a flow chart or other organizational information. The inventors of the present disclosure have identified that prior systems often leave a disconnect between the reference material describing the workflow, and the work itself (e.g., the work unit records). Therefore, adhering to the workflow requires substantial human intervention to keep tags up-to-date and accurate with respect to where work is within the progression through a workflow. Other deficiencies in prior systems may exist based on this disconnect.

To address these and/or other problems, one or more implementations presented herein propose a technique to characterize work unit records of a collaboration environment based on stages within a workflow. A "workflow" may generally refer to a work process that is orchestrated, ongoing, and/or repeatable via an ordered series of stages. A workflow may be utilized as a technical tool that organizes an ordered series of stages, and provides an overview about how the work impacts, or is impacted by, the collaboration environment at each stage through the utilization of stage-specific rules. An individual stage may represent one element in an ordered series. A stage may be comprised of one or more work unit records and may be associated with rules that apply to the individual ones of the work unit records at the stage. In some implementations, a stage may be associated with one or more rules that apply when a stage is "entered" into and/or "exited" from. By way of non-limiting illustration, a rule for a stage may specify that certain form fields must be completed as part of entering the stage. Further, a rule for a subsequent stage may specify a set of automated actions that are carried out when the work enters the subsequent stage.

Completion of one or more of the work unit records at a given stage may impact the progress toward completion of the given stage and/or completion of a workflow as a whole. Completion of the stages in a workflow may impact progress toward completion of the workflow. A workflow may progress linearly from stage to stage, or a given stage may branch off to more than one other stage. Creation of a workflow may be facilitated by a user interface walkthrough, where users add work unit records to individual stages and/or specify rules that apply at the stages as needed.

Within a workflow UI view, the work unit records at each stage may be accessible. For example, users may select individual stages to the see the work unit records that make up the stages, then select individual work unit records to be taken to pages of the work objects. In this manner, the work may be directly connected to the workflow so that users can seamlessly go between the workflow and the work itself. One or more implementations of the present disclosure may be directed to providing the direct connection between the work and the workflow so that users can seamlessly go between the workflow and the work itself.

These, along with other features and/or functionality presented herein, may be recognized by persons of ordinary skill in the art as providing improvements upon the operation of a collaboration environment including, among others, increased efficiency and accuracy in the creation and management of records and/or the information making up the records of the collaboration environment.

One or more implementations of a system configured to characterize work unit records of a collaboration environment based on stages within a workflow may include one or more hardware processors configured by machine-readable instructions and/or other components. Executing the machine-readable instructions may cause the one or more hardware processors to facilitate characterizing work unit records of a collaboration environment based on stages within a workflow. The machine-readable instructions may include one or more computer program components. The one or more computer program components may include one or more of an environment state component, a user interface component, a workflow component, and/or other components.

The environment state component may be configured to manage environment state information maintaining a collaboration environment. The collaboration environment may be configured to facilitate interaction by users with the collaboration environment. The environment state information may include work unit records for units of work managed, created, and/or assigned within the collaboration environment. The environment state information may include workflow information. The work unit records may specify values of work unit parameters characterizing the units of work. The work unit parameters may include a stage parameter characterizing stage of individual ones of the units of work within workflows. The workflows may be defined by the workflow information. The workflows may comprise sets of stages through which individual ones of the work unit records progress.

The workflow component may be configured to manage workflow information characterizing the workflows. The workflow information may include one or more of progression information, rule information, and/or other information. The progression information may specify user-defined orders in which the individual ones of the work unit records progress through individual ones of the sets of stages. The rule information may include rules that apply to the individual ones of the work unit records at individual stages in the sets of stages. By way of non-limiting illustration, the workflows may include a first workflow and/or other workflows. The first workflow may comprise one or more of a first set of stages, first progression information, first rule information, and/or other information. The first set of stages may include one or more of a first stage associated with a first stage value of the stage parameter, a second stage associated with a second stage value of the stage parameter, and/or other stages. The first progression information may specify a first user-defined order in which the individual ones of the work unit records progress through the first set of stages. The first user-defined order may define, for example, progress from the first stage to the second stage, from the second stage to one or more other stage, and/or other progressions. The first rule information may include one or more of first rules that apply to the individual ones of the work unit records at the first stage, second rules that apply to the individual ones of the work unit records at the second stage, and/or other rules.

The workflow component may be configured to, responsive to the individual ones of the work unit records being at the individual stages, and based on the workflow information, select and/or apply the rules that apply to the individual ones of the work unit records at the individual stages. By way of non-limiting illustration, responsive to a first work unit record being at the first stage, workflow component may be configured to select and/or apply the first rules to the first work unit record. By way of non-limiting illustration, responsive to the first work unit record progressing from the first stage to the second stage, workflow component may be configured to select and apply the second rules to the first work unit record.

As used herein, any association (or relation, or reflection, or indication, or correspondency) involving servers, processors, client computing platforms, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
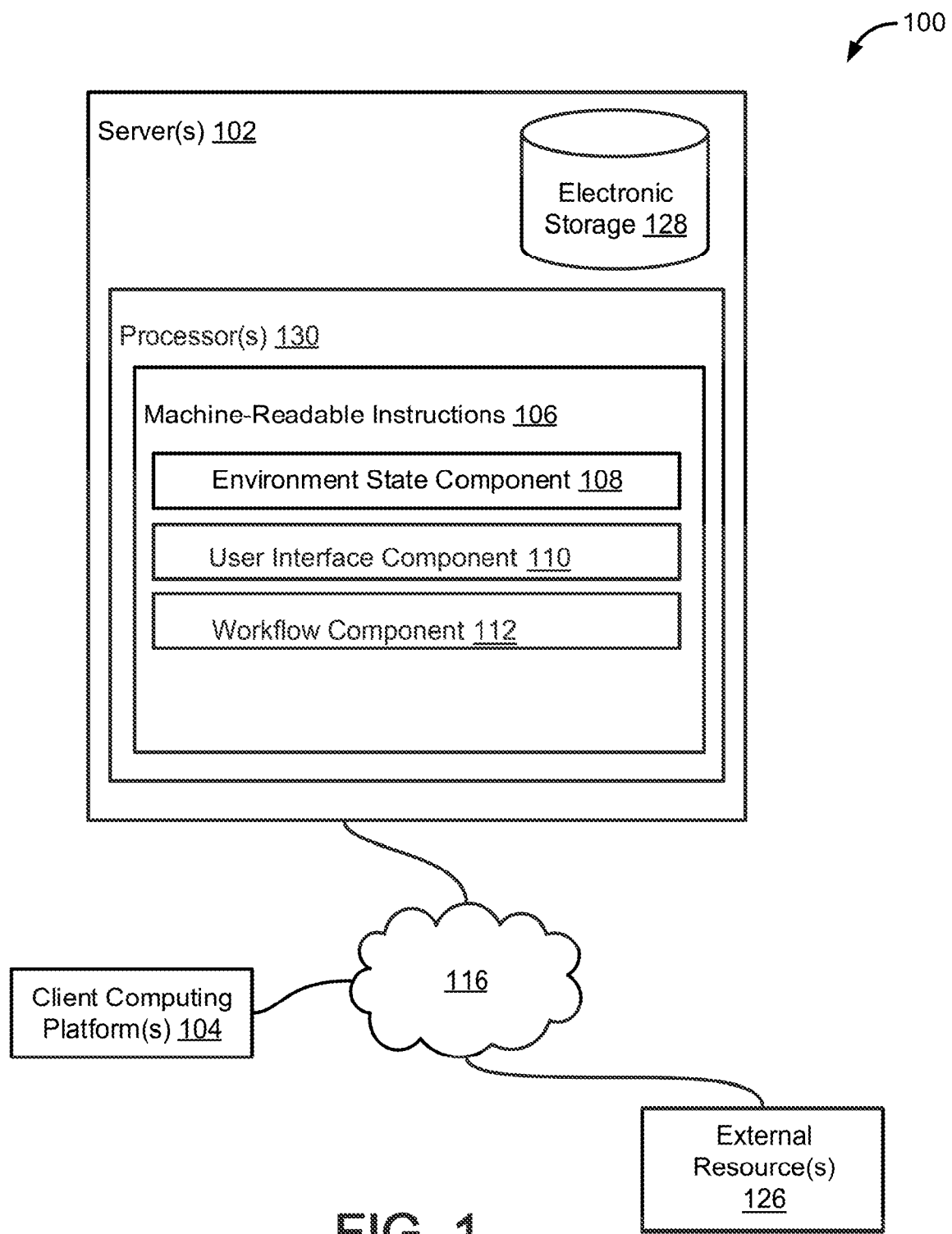
FIG. 1 illustrates a system configured to characterize work unit records of a collaboration environment based on stages within a workflow, in accordance with one or more implementations.

FIG. 1 illustrates a system 100 configured to characterize work unit records of a collaboration environment based on stages within a workflow, in accordance with one or more implementations. The characterization may allow work to be directly connected to a workflow so that the collaboration environment is configured with a seamless connection between the workflow and the work itself.

In some implementations, system 100 may include one or more of one or more servers 102, one or more client computing platforms 104, external resource(s) 126, and/or other components. Server(s) 102 may be configured to communicate with one or more client computing platforms 104, one or more external resources 126, and/or other entities of system 100 according to a client/server architecture and/or other architectures. Client computing platform(s) 104 may be configured to communicate with other client computing platforms via server(s) 102 and/or according to a peer-to-peer architecture and/or other architectures. Users may access system 100 and/or instances of the collaboration environment via client computing platform(s) 104. Server(s) 102 may be remote from client computing platform(s) 104. Client computing platform(s) 104 may be remote from each other.

Server(s) 102 may include one or more of non-transitory electronic storage 128, one or more processors 130 configured by machine-readable instructions 106, and/or other components. The non-transitory electronic storage 128 may store one or more records and/or other information. Machine-readable instructions 106 may include one or more instruction components. The instruction components may include computer program components. Executing the machine-readable instructions 106 may cause server(s) 102 to facilitate generating records within a collaboration environment. The computer program components may include one or more of an environment state component 108, user interface component 110, a workflow component 112, and/or other components.

Environment state component 108 may be configured to manage environment state information and/or other information used in maintaining a collaboration environment. The collaboration environment may be configured to facilitate interaction by users with the collaboration environment. The environment state information may include one or more records. The one or more records may include one or more of user records, work unit records, and/or other records. The user records may include user information describing the users of the collaboration environment. The work unit records which may include work information describing units of work assigned to, created by, and/or managed by the users within the collaboration environment.

The user information in the user records may include values of user parameters and/or other information. The values of the user parameters may be organized in the user records corresponding to users interacting with and/or viewing the collaboration environment. The values of the user parameters may include information describing the users, their actions within the collaboration environment, their settings, and/or other user information; and/or metadata associated with the users, their actions within the environment, their settings, and/or other user information. Individual ones of the users may be associated with individual ones of the user records. A user record may define values of the user parameters associated with a given user.

The values of the user parameters may, by way of non-limiting example, specify one or more of: a user name, a group, a user account, user role information, a user department, descriptive user content, a to-email, a from-email, a photo, an organization, a workspace, one or more user comments, one or more teams the user belongs to, one or more of the user display settings (e.g., colors, size, project order, task order, other unit of work order, etc.), one or more authorized applications, one or more interaction parameters (e.g., indicating a user is working on/worked on a given unit of work, a given user viewed a given work unit of work, a given user selected a given unit of work, a timeframe a given user last interacted with and/or worked on a given unit of work, a time period that a given unit of work has been idle, and/or other interaction parameters), one or more notification settings, one or more progress parameters, status information for one or more work units the user is associated with (units of work assigned to the user, assigned to other users by the user, completed by the user, past-due date, and/or other information), one or more performance/productivity metrics of a given user (e.g., how many units of work the user has completed, how quickly the user completed the units of work, how quickly the user completes certain types of work units, the efficiency of the user, bandwidth of the user, activity level of the user, how many business objectives the user has helped fulfill through their completion of units of work, etc.), application access information (e.g., username/password for one or more third-party applications), one or more favorites and/or priorities, schedule information, and/or other information.

Schedule information for the individual users may include one or more calendar entries associated with the individual users. The individual calendar entries may be associated with individual start dates and individual end dates. In some implementations, schedule information may be stored locally within electronic storage 128 by virtue of features and/or functionality provided within a collaboration environment. By way of non-limiting illustration, a collaboration environment may have features and/or functionality of a calendar application configured to facilitate calendaring entries into a schedule. It is noted that schedule information may be determined through features and/or functionality provided by one or more external resources 126. By way of non-limiting illustration, and external resource may include a calendar application which may be external to a collaboration environment. The collaboration environment may have permissions to access the external calendar application to determine and/or obtain schedule information.

The work information in the work unit records may include values of one or more work unit parameters and/or other information. The values of the work unit parameters may be organized in work unit records corresponding to units of work managed, created, and/or assigned within the collaboration environment. A given unit of work may have one or more assignees, owners, and/or collaborators working on the given work unit. Units of work may include one or more of tasks, projects, objectives, and/or other units of work.

Units of work may be created by a given user for the given user and/or created by the given user and assigned to one or more other users. Units of work may be created by a given user for the given user and/or created by the given user and managed by one or more other users. Tasks may include to-do items and/or action items one or more users should accomplish and/or plan on accomplishing in order to complete a task. Individual units of work may include and/or may be associated with one or more digital content items. An individual unit of work may include an individual digital content item by virtue of the individual digital content item (and/or a copy or instance thereof) being attached and/or appended thereto. A digital content item may include one or more of an image, a video, an audio file, a PDF, a word document, and/or other digital content items.

In some implementations, units of work created by, assigned to, and/or completed by the users may refer generally to a linking of the units of work with the individual users in the collaboration environment. A unit of work may be linked with a user in a manner that defines one or more relationships between the user and the unit of work. Such a relationship may connote and/or be a result of an action (past, present, and/or future) of the user with respect to the unit of work. Such actions may include one or more of creating a work unit record for a unit of work, being assigned to participate in a unit of work, participating in a unit of work, being granted access to a work unit record of a unit of work, adjusting a value of a work unit parameter of a work unit record of a unit of work, being assigned a role at the unit of work level, and/or other actions.

Individual sets of work unit records may be defined by a record hierarchy. A record hierarchy may convey individual positions of work unit records (and their corresponding units of work) in the record hierarchy. By way of non-limiting illustration, a position may specify one or more of a work unit record being superior to another work unit record, a work unit record being subordinate to another work unit record, and/or other information. As a result, individual work unit records in the individual sets of work unit records may be subordinate to other individual work unit records in the individual sets of work unit records. For example, a work unit record may define a unit of work comprising a task, and a subordinate work unit record may define a unit of work comprising a sub-task to the task. A record hierarchy may define a relationship between work unit records. A work unit record may have some restrictions placed on it by virtue of having a subordinate work unit record. By way of non-limiting illustration, a work unit record may be restricted from access (or restricted from marking complete) by one or more users unless and/or until a subordinate work unit record is completed and/or started.

Individual work unit records may include hierarchical information defining a record hierarchy of the individual work unit records. The hierarchical information of a work unit record may include one or more of information identifying other work unit records associated in a record hierarchy the work unit record belongs to, a specification of the position of the work unit record in the hierarchy, restrictions and/or other relationships placed on the work unit record by virtue of its position, and/or other information.

In some implementations, values of work unit parameters may specify one or more of a unit of work name, a unit of work description, user role information, one or more unit of work dates (e.g., a start date, a due date or end date, a completion date, and/or dates), project inclusion (e.g., identification of projects supported by the individual units of work), one or more members associated with a unit of work (e.g., an owner, one or more collaborators, collaborator access information, and/or other unit of work collaborators and/or collaborator information), completion state, one or more user comment parameters (e.g., permission for who may make comments such as an assignee, an assignor, a recipient, one or more followers, and/or one or more other interested parties; content of the comments; one or more times; presence or absence of the functionality of up-votes; one or more hard-coded responses; and/or other parameters), one or more interaction parameters (e.g., indicating a given unit of work is being worked on/was worked on, a given work unit of work was viewed, a given unit of work was selected, how long the given unit of work has been idle, a last interaction parameter indicating when and what user last interacted with the given unit of work, users that interacted with the given unit of work, quantity and/or content of comments on the unit of work, and/or other interaction parameters indicating sources of the interactions, context of the interactions, content of the interactions and/or time for the interactions), one or more digital content item attachments, notification settings, privacy, an associated URL, one or more interaction parameters (e.g., sources of the interactions, context of the interactions, content of the interactions, time for the interactions, and/or other interaction parameters), updates, state of a workspace for a given unit of work (e.g., application state parameters, application status, application interactions, user information, and/or other parameters related to the state of the workspace for a unit of work), one or more performance/productivity metrics for a given unit of work, hierarchical information, dependency, one or more custom fields (e.g., priority, cost, stage, and/or other custom fields), stage, and/or other information.

In some implementations, work unit parameters may include one or more of a work assignment parameter, work completion parameter, a work management parameter, work creation parameter, dependency parameter, stage parameter, and/or other parameters. The values of the work assignment parameter may describe assignees of individual units of work. The values of the work management parameter may describe users who manage individual units of work and/or the extent in which they manage. The values of the work creation parameter may describe creation characteristics of individual units of work. The creation characteristics may include who created the work unit record, when it was created, and/or other information. The values of the stage parameter may characterize stage of individual ones of the units of work within workflows.

In some implementations, values of a dependency parameter may describe whether a given unit of work is dependent on one or more other units of work. A unit of work being dependent on an other unit of work may mean the unit of work may not be completed, started, assigned, and/or have other interactions performed in relation to the unit of work before some action is performed on the other unit of work. By way of non-limiting illustration, a unit of work may not be started until another unit of work is completed, meaning the unit of work may be dependent on the other unit of work. In some implementations, values of the dependency parameter may go hand in hand with the hierarchical information. By way of non-limiting illustration, a unit of work that is subordinate to an other unit of work may be dependent on the other unit of work, or vice versa.

The values of the work assignment parameter describing assignment of users to units of work may be determined based on one or more interactions by one or more users with a collaboration environment. In some implementations, one or more users may create and/or assign one or more unit of work to themselves and/or another user. In some implementations, a user may be assigned a unit of work and the user may effectuate a reassignment of the unit of work from the user or one or more other users.

In some implementations, values of the work completion parameter may indicate that a completion status of a unit of work has changed from "incomplete" to "marked complete" and/or "complete." In some implementations, a status of complete for a unit of work may be associated with the passing of an end date associated with the unit of work. In some implementations, a status of "marked complete" may be associated with a user providing input via the collaboration environment at the point in time the user completes the unit of work (which may be before or after an end date). In some implementations, a completion status may include one or more of "rejected," "revisions required," "incomplete," and/or other statuses. By way of non-limiting illustration, for units of work that require one user to review work by another user, additional user interface elements may be presented where users can set the status as one or more of "marked complete," "incomplete," "rejected," "revisions required," and/or other status. In some implementations, a status of rejected for a unit of work may be associated with the passing of an end date associated with the unit of work without the work having been marked complete manually. In some implementations, a status of rejected for a unit of work may be associated with a user specifying the unit of work as rejected. In some implementations, a status of revisions required for a unit of work may be associated with a user specifying that the work being reviewed requires changes, but is otherwise approved. In some implementations, a status of revisions required may present the reviewing user with options to specify what revisions are required. In some implementations, a status of revisions required may cause a follow up unit of work to be generated which is assigned back to the assignor of the original work.

The stage values of the stage parameter may characterize stage of individual ones of the units of work within workflows. In some implementations, a work unit record having a stage value for a stage parameter may refer generally to a linking of the work unit record to a workflow. The stage of individual ones of the units of work within workflows may be characterized based on one or more of identification of a given workflow, identification of a current stage within a given workflow, when a work unit record transitioned into or out of a stage, a transition state (e.g., transitioning "into" a stage, transitioning "out" of a stage, etc.), and/or other information. A transition state may be helpful in the organization of work, so that the work may be treated as being "out" of a prior stage so that the rules for prior stage may not apply, but may also not be "ready" to move to the next stage until other things are met.

In some implementations, stage values may be specified based on one or more of user input, inferences, automated transitions according to a workflow, and/or other techniques. By way of non-limiting illustration, a user may specifically indicate that a record is within a stage by specifying the stage through interaction with a user interface (e.g., selection in a drop-down menu, typing into a text box, etc.). In some implementations, stage values may be inferred by other information and/or user actions within the collaboration environment. For example, values of other parameters of a record may be an indicator as to what stage the record is in. By way of non-limiting illustration, a record may be configured with a "status" field that is user-specified, or toggled to different statuses, based on user interaction. A given status may be correlated to a give stage value. Accordingly, by tracking the "status" field (or other values), a stage value (and transitions thereof) may be inferred.

In some implementations, managing the environment state component 108 may include maintaining queues of the units of work assigned to the users. The queues may be presented to the users in a user interface of the collaboration environment to facilitate access to the units of work via work unit pages. Individual queues may represent the units of work assigned to individual users organized in an order based on the individual end dates and/or other dates (e.g., start dates) and/or other ordering. Individual queues may be presented in a user interface based on one or more of a list view, a calendar view, and/or other views. The calendar view may be a calendar view by week, by more than one week (e.g., $1^{st}$ through $15^{th}$), by month, by more than one month (e.g., May through July), and/or other calendar views. Units of work may be represented in a calendar view by user interface elements (e.g., icons, calendar entries, etc.).

In some implementations, environment state component 108 may be configured to manage information defining work unit pages (sometimes referred to simply as "pages") corresponding to the individual units of work. Individual work unit pages may provide access to individual units of work and/or their records. Managing information may include one or more of determining, obtaining, receiving, requesting, checking, storing, modifying, and/or other operations. Managing information defining individual work unit pages may include providing information to the user interface component 110 to effectuate presentation of the work unit pages, and/or other information. In some implementations, individual work unit pages may include individual sets of interface elements displaying the values of one or more of the work unit parameters of the individual units of work. By way of non-limiting illustration, individual work unit pages may include individual user interface elements displaying a stage value of a stage parameter. Users may access work unit records via the work unit pages by viewing, adding, changing, deleting, and/or otherwise interacting with values of work unit parameters stored by the work unit records. In some implementations, work unit pages providing access to tasks may be referred to as task pages; work unit pages providing access to projects may be referred to as project pages; and work unit pages providing access to objectives may be referred to as objective pages. In some implementations, user interface elements displaying stage value may be selectable to effectuate presentation of user interface showing a workflow. Similarly, user interface elements on a view of a workflow representing work unit records may be selectable to effectuate presentation of work unit pages for the work unit records.

In some implementations, work unit records may define projects. The projects may be defined by project information and/or other information. Project information may include values of work unit parameters for projects managed within the collaboration environment. The work unit parameters for projects may be referred to as "project parameters." The work unit parameters comprising project parameters may be specific to projects and may include one or more parameters not shared with tasks and/or objectives. The project parameters may characterize one or more projects created, owned, assigned, and/or managed within the collaboration environment and/or via the collaboration environment, and/or the metadata associated with the one or more projects. Individual ones of the projects may be associated with individual ones of the records. A given project may have one or more owners and/or one or more collaborators working on the given project. The given project may be associated with one or more other units of work assigned to one or more users under the given project heading. In some implementations, projects may include one or more units of work that may directly facilitate progress toward fulfillment of the projects. Accordingly, completion of units of work may directly contribute to progress toward fulfillment of the project. By way of non-limiting illustration, an individual project may be associated with a client, and the units of work under the individual project heading may be work directly contributing to the fulfillment of a business relationship with the client.

The values of the project parameters may, by way of non-limiting example, include one or more of: one or more units of work associated with individual ones of the projects (which may include values of other work unit parameters defined by one or more work unit records), status information, user role information, one or more user comment parameters (e.g., a creator, a recipient, one or more followers, one or more other interested parties, content, one or more times, upvotes, other hard-coded responses, etc.), a project name, a project description, one or more project dates (e.g., a start date, a due date, a completion date, and/or other project dates), one or more project collaborators (e.g., an owner, one or more other project collaborators, collaborator access information, and/or other project collaborators and/or collaborator information), one or more attachments, notification settings, privacy, an associated URL, one or more interaction parameters (e.g., sources of the interactions, context of the interactions, content of the interactions, time for the interactions, and/or other interaction parameters), updates, ordering of units of work within the given project, state of a workspace for a given task within the given project, and/or other information.

In some implementations, work unit records may define objectives. Objectives may be defined by objective information including values of one or more work unit parameters. The values of the work unit parameters may be organized in records corresponding to objectives (sometimes referred to as "business objectives") managed, created, and/or owned within the collaboration environment. The work unit parameters corresponding to objectives may be referred to as "objective parameters." The work unit parameters comprising objective parameters may be specific to objectives and may include one or more parameters not shared with tasks and/or projects. A given objective may have one or more collaborators, and/or team members working on the given objective. Objectives may be associated with one or more units of work one or more users should accomplish and/or plan on accomplishing. Objectives may be created by a given user for the given user and/or created by the given user and assigned to be owned to one or more other users. Individual objectives may include one or more of an individual goal, an individual sub-goal, and/or other business objectives assigned to be owned by a user and/or associated with one or more users.

The objectives may be associated with a set of units of work that may indirectly facilitate progress toward fulfillment of the objectives. The set of units of work may not directly contribute to the progress. By way of non-limiting illustration, a connection between the set of units of work and a corresponding objective may be indirect in that completion of at least one of the units of work may have no direct impact on progress toward fulfillment of the objective. The concept of "no direct impact" may mean that completion of the at least one unit of work may not cause progress toward fulfillment of the business objective without independent action outside of the at least one unit of work and/or project. Instead, the fulfillment of the at least one unit of work may make such independent action more likely (e.g., through coercion, assistance, education, incentivization, reminder, etc.). However, in some implementations, objectives may be associated with one or more units of work that may directly facilitate progress toward fulfillment of the objectives. Accordingly, completion of the set of units of work may directly contribute to the progress toward fulfillment. Objectives may be associated with an objectives and key result (OKR) goal-setting framework. Objectives may be specified on one or more of a team basis, organization basis, and/or other specifications. In some implementations, objectives may be characterized as user objectives. User objectives may be specified on an individual user basis. A user objectives may be associated with a set of units of work assigned to a user that may indirectly (and/or directly) facilitate progress toward fulfillment of the user objective.

In some implementations, objectives may be described based on one or more of a business objective name, a business objective description, one or more business objective dates (e.g., a start date, a due date, and/or dates), one or more members associated with a business objective (e.g., an owner, one or more other project/task members, member access information, and/or other business objective members and/or member information), progress information (e.g., an update, a hardcoded status update, a measured status, a progress indicator, quantity value remaining for a given business objective, completed work units in a given project, and/or other progress information), one or more interaction parameters, notification settings, privacy, an associated URL, one or more custom fields (e.g., priority, cost, stage, and/or other custom fields), and/or other information.

The values of the objective owner parameter describing objectives owned by the individual users may be determined based on one or more interactions by one or more users with a collaboration environment. In some implementations, one or more users may create and/or assign ownership of one or more objectives to themselves and/or another user. In some implementations, a user may be assigned to own an objective and the user may effectuate a reassignment of ownership of the objective from the user or one or more other users.

Progress information for the individual objectives may convey progress toward fulfillment of the individual objectives. In some implementations, the progress toward fulfillment of the business objectives may be specified as one or more of a quantitative value, a qualitative value, and/or other information. In some implementations, the quantitative value may be a percentage of completion, an integer value, a dollar amount, and/or other values. In some implementations, progress toward fulfillment of the individual objectives may be determined independently from incremental completion of the units of work associated with the individual objectives. The completion of the units of work associated with a given objective may not directly progress the given business objective toward fulfillment, but completing the units of work may make accomplishing the business objective more likely (e.g., through coercion, assistance, education, incentivization, reminder, etc.). However, in some implementations, progress toward fulfillment of the individual business objectives may be directly determined based on incremental completion of the units of work in the individual sets of units of work associated with the individual business objectives.

User role information may specify individual roles of the individual users. A role may represent a position of an individual user. The position may be specified based on a description of one or more of a job title, level, and/or other descriptions of position. The role may be specified with respect to a business organization as a whole and/or other specifications. By way of non-limiting illustration, a role may include one or more of chief executive officer (or other officer), owner, manager, supervisor, accountant, associate, employee, intern, entry level, midlevel, senior, administrator, director, foreman, engineer, product developer, human resource officer, artist, art director, and/or other descriptions.

In some implementations, user role information may specify roles of the users within the units of work. The roles may convey expected contribution of the users in completing and/or supporting the units of work. The individual roles of individual users within some units of work (e.g., a task) may be specified separately from the individual roles of the individual users within other units of work (e.g., a project associated with the task). The individual roles of individual users within the units of work may be specified separately from the individual roles of the individual users within a business organization as a whole.

The user interface component 110 may be configured to effectuate presentation of instances of a user interface of the collaboration environment. The user interface may provide one or more views of the collaboration environment and/or provide other features and/or functionality. The one or more views may include one or more pages of the collaboration environment, a workflow creation view, a workflow access view, and/or other views. In some implementations, an individual view of the collaboration environment may textually and/or graphically display information from one or more of a user record, a work unit record, workflows, and/or other records. By way of non-limiting illustration, a view may display one or more of a work unit page, a queue of units of work, a workflow including an ordered series of stages, and/or other information.

In some implementations, the workflow component 112 may be configured to manage workflow information characterizing workflows. The workflows may comprise sets of stages through which individual ones of the work unit records progress. An individual workflow may be associated with an individual set of stages. The workflow information may include, for individual workflows, one or more of progression information, rule information, and/or other information.

The progression information may specify orders in which the individual work unit records progress through individual sets of stages. An order may define an arrangement or position of individual stages in relation to other stages in a set of stages. The orders may be user-defined (see, e.g., user interface component 110). In some implementations, an order may define a linear order, so that work may progress linearly from one stage to one other stage. In some implementations, an order may define a branching of stages, so that a given stage may branch off to more than one other stage. Multiple stages may be considered as being concurrently within a same position in a workflow. In some implementations, individual workflows may act independently from other workflows. In some implementations, a stage of a workflow may branch off into a stage of an other workflow. Accordingly, in some implementations, multiple workflows may be interconnected and/or dependent on one another. In some implementations, a work unit record may be associated with multiple workflows such that the work unit record may impact the multiple workflows concurrently, and/or be impacted by the multiple workflows concurrently.

By way of non-limiting illustration, a workflow may have a first stage that occurs temporally first in an ordered set of stages, one or more intermediate stages that occur after the first stage and follow one another (if there are multiple intermediate stages), and/or a last stage that occurs temporally last in the ordered set of stages.

The rule information may define rules that apply to the individual ones of the work unit records at individual stages in the sets of stages of the workflows. The rule information may include one or more of criteria information, automation information, and/or other information.

The criteria information may include progress rules and/or other rules. The progress rules may specify sets of progress criteria that must be met in order for the individual ones of the work unit records to progress from one stage to another.

In some implementations, the progress rules may specify sets of progress criteria that must be met in order for the individual ones of the work unit records to progress from one stage to a transition state (e.g., transitioning "into" another stage, transitioning "out" of a given stage). A transition state may be a state of a work unit record being "between" stages, and provides context as to whether the work unit record is transitioning out of, or into a given stage. Accordingly, a progress rule may specify criteria that must be met in order for a record to progress from one stage to a transition state of transitioning "out" of that stage. A progress rule may specify criteria that must be met in order for the record to progress from the transition state of transitioning "out" of the stage, to another transition state of transitioning "into" an other stage, before transitioning to the other stage. A progress rule may specify criteria that must be met in order for the record to progress from the transition state of transitioning "into" the other stage, to being in the other stage.

A progress criterion may be specified with respect to one or more values of one or more parameters of one or more records, and/or other information. Fulfilment of a progress criterion may be dictated by a value of a parameter being a certain value, and/or changing to and/or from a certain value. Fulfilment of a progress criterion may be dictated by other information being specified and/or present within the collaboration environment.

By way of non-limiting illustration, a progress criterion may be associated with completing a unit of work, e.g., the progress criterion may be fulfilled by virtue of a value of a completion parameter being set to "complete" or "marked complete." By way of non-limiting illustration, a progress criterion may be associated with assignment of a work unit record, e.g., the progress criterion may be fulfilled by virtue of a value of an assignment parameter being set to a given user (irrespective of who the given user is), and/or to a particularly identified user (e.g., a specific user or user of a given role). By way of non-limiting illustration, a progress criterion may be associated with creating a work unit record, e.g., the progress criterion may be fulfilled by virtue of a value of a work creation parameter specifying that a work unit record has been created on or by a certain date. By way of non-limiting illustration, a progress criterion may be associated with uploading a digital content item to a record, e.g., the progress criterion may be fulfilled by virtue of a file for a digital content item appearing in a work unit record. By way of non-limiting illustration, a progress criterion may be associated communication between users within the collaboration environment, e.g., the progress criterion may be fulfilled by virtue of a page for a work unit record including content added to a chat portion of the page, meaning a user has communicated with one or more other users within the collaboration environment. It is noted that the above examples are for illustrative purposes only and are not to be considered limiting. Instead, those skilled in the art will appreciate that progress criterion may be specified with respect to other values of other parameters, and/or other information available within a collaboration environment.

In order for a given work unit record to progress, a progress criterion that must be met to progress the given work unit record may be met by one or more of the given work unit record itself, one or more other records, other interactions within the collaboration environment, and/or interactions outside the collaboration environment. That is, in some implementations, the information in a given work unit record may itself provide the basis for which fulfilment of progress criteria may be determined in order for that given work unit to progress. In some implementations, the information in a given work unit record may provide the basis for which fulfilment of progress criteria may be determined in order for an other work unit record to progress. In some implementations, other information within the collaboration environment may provide the basis for which fulfilment of progress criteria may be determined in order for one or more work unit records to progress. In some implementations, progress of work unit records through a set of stages may include progress from a stage to a transition state (e.g., transitioning "into" another stage, transitioning "out" of a given stage).

By way of non-limiting illustration, a progress criterion for transitioning a given work unit record to and/or from one or more stages may be fulfilled by completing the given work unit record. In some implementations, a progress criterion for transitioning a given work unit record to and/or from one or more stages may be fulfilled by completing an other unit of work defined by an other work unit record.

By way of non-limiting illustration, a progress criterion for transitioning a given work unit record to and/or from one or more stages may be fulfilled by assignment of the given work unit record. In some implementations, a progress criterion for transitioning a given work unit record to and/or from one or more stages may be fulfilled by assignment of an other work unit record.

By way of non-limiting illustration, a progress criterion for transitioning a given work unit record to and/or from one or more stages may be fulfilled creating the given work unit record. In some implementations, a progress criterion for transitioning a given work unit record to and/or from one or more stages may be fulfilled by creating an other work unit record.

By way of non-limiting illustration, a progress criterion for transitioning a given work unit record to and/or from one or more stages may be fulfilled uploading a digital content item to the given work unit record. In some implementations, a progress criterion for transitioning a given work unit record through one or more stages may be fulfilled by uploading a digital content item to an other work unit record.

By way of non-limiting illustration, a progress criterion for transitioning a given work unit record to and/or from one or more stages may be fulfilled by communication between users in a page of the given work unit record. In some implementations, a progress criterion for transitioning a given work unit record to and/or from one or more stages may be fulfilled by communication between users in a page of an other work unit record.

In some implementations, a progress criterion for transitioning a given work unit record out of a stage (e.g., a transition state) may be fulfilled by completing the given work unit record, while a progress criterion for transitioning the given work unit record into another stage may be fulfilled by completing an other given work unit record. In some implementations, progress criterion for transitioning a given work unit record from out of a stage (e.g., a transition state) may be fulfilled by uploading a digital content item to the given work unit record, while a progress criterion for transitioning the given work unit record from the state of transitioning out of the given stage to a state of transitioning into an other stage may be fulfilled by user communications (e.g., adding comments) within a page of the given unit of work. Still further, progress criterion for transitioning the given work unit record from the state of transitioning into the other stage to actually being in the other stage may be fulfilled by reassigning the given work unit record to another user.

It is noted that the above examples of fulfilment are for illustrative purpose only and are not to be considered limiting. Instead, those skilled in the art will appreciate that fulfilment of progress criterion may be specified in other ways.

The automation information may include automation rules and/or other rules. The automation rules may specify sets of automated actions to carry out within the collaboration environment in response to trigger events. An individual automation rule may specify an individual set of automated actions to carry out in response to one or more trigger events.

In some implementations, an individual automated action may include effectuating one or more of creation of, change in, and/or specification of one or more values of one or more of parameters. In some implementations, the creation of, change in, and/or specification of values of parameters may be accomplished by accessing a corresponding record (e.g., user record, work unit record, and/or other records). In some implementations, creation of, change in, and/or specification of an individual value may be reflected in views of the collaboration environment accessed by users. By way of non-limiting illustration, automated actions may include one or more of creating new ones of the work unit records, specifying user assignments to the units of work, specifying due dates of the units of work, completing one or more of the units of work, specifying one or more of the units of work as "incomplete," causing progress of other ones of the work unit records through other ones of the workflows, sending communications to one or more of the users, and/or other actions. In some implementations, new records may be created using templates for records. Templates may include one or more values of one or more parameters that are predetermined and/or determinable upon implementation of a template.

In some implementations, individual automated actions may be classified by individual action types. An action type may dictate the extent in which an automation action effects the collaboration environment. An action type may include one or more of a record creation type, value specification type, and/or other types. A record creation type automated action may include creating one or more of a user record, work unit record, and/or other records. The creation of a record may include generating an instance of the record in the collaboration environment. The creation of the record by a record creation type automated action may not specifically define values of the parameters within the record and/or may set values to one or more of default values, null values, and/or other values. A value specification type automated action may include changing, and/or specifying, one or more values of one or more of the parameters contained within a record.

In some implementations, value specification type automated action may further be classified by one or more action subtypes based on the individual values of the individual parameters associated with the individual automated actions. An action subtype may include one or more of a time-based subtype, privacy and/or permissions subtype, accessibility subtype, interaction subtype, and/or other subtype.

An automated action of the time-based subtype may effectuate change in, and/or specification of, one or more values of one or more of the parameters related to time. For a work unit record, this may include one or more unit of work dates (e.g., a start date, a due date, a completion date, and/or dates). For a user record, this may include one or more of a start of employment date, an end of employment date, a length of employment period, a length of vacation period, and/or other information.

An automated action of the privacy and/or permissions subtype may correspond to values of parameters related to privacy and/or permissions. By way of non-limiting illustration, an automated action performed on a user record being of the privacy and/or permissions subtype may include change of, and/or specification of, one or more of one or more teams a user belongs to, one or more user display settings (e.g., colors, size, project order, task order, other unit of work order, etc.), one or more authorized applications, application access information (e.g., username/password for one or more third-party applications), one or more favorites and/or priorities, and/or other information for the user. By way of non-limiting illustration, an automated action performed on a work unit record being of the privacy and/or permissions subtype may include change of, and/or specification of, one or more of one or more user comment parameters (e.g., permission for who may comments such as a creator, a recipient, one or more followers, and/or one or more other interested parties; content of the comments; one or more times; presence or absence of the functionality of up-votes; one or more hard-coded responses; and/or other parameters), notification settings, privacy settings, dependencies between one or more work units, and/or other values.

An automated action of the accessibility subtype may correspond to values of parameters which may be required in a record (user and/or work unit) in order for the record to take effect within the collaboration environment. Values of parameters which may be required in a record in order for the record to take effect may refer to values that, if left undefined, would not provide any meaningful use within the collaboration environment. In other words, the values of parameters which may be required in a record in order for the record to take effect may refer to a minimum quantity of parameters which may need to be specified in order to allow users to interact with and/or access the record. By way of non-limiting illustration, an automated action performed on a user record being of the accessibility subtype may include change of, and/or specification of, one or more of a user name, a user account, a user role, a user department, descriptive user content, a to-email, a from-email, a photo, an organization, and/or other values. By way of non-limiting illustration, an automated action performed on a work unit record being of the accessibility subtype may include change of, and/or specification of, one or more of a unit of work description, one or more members associated with a unit of work (e.g., an owner, one or more other project/task members, member access information, one or more assignees, and/or other information), an associated URL, and/or other values.

An automated action of the interaction subtype may correspond to values of parameters which may be specified in a record (user and/or work unit) in order to provide further functionality and/or accessibility within the collaboration environment. Values of parameters which may be specified in a record (user and/or work unit) in order to provide further functionality and/or accessibility may refer to values other than those associated with the time-based subtype, privacy and/or permissions subtype, accessibility subtype, and/or other subtypes.

It is noted that the classification of automated actions into action types and/or subtypes, and/or the descriptions of the different actions types and/or subtypes are provided for illustrative purposes only. Instead, it is to be understood that action types and/or subtype may be described in other ways, and/or automated actions may be classified in other ways.

In some implementations, an individual automated action may be carried out simultaneously (or near simultaneously) with an individual detection of an individual occurrence of an individual trigger event and/or within a specified time frame following an individual detection of an individual occurrence of an individual trigger event. In some implementations, a specified time frame may include a "waiting" period of time before an action is carried out. In some implementations, the waiting period of time may be satisfied by one or more of the passage of the period of time, some other trigger event, and/or other events and/or actions within the collaboration environment.

In some implementations, individual trigger events may be specified as individual occurrences of change of one or more values of one or more parameters. Occurrences of change may convey a state change of a parameter. The state change may not consider what the change is, but instead that a change occurred. For example, a trigger event may include an occurrence of a reassignment of a unit of work from one user to an other user.

In some implementations, individual trigger events may be specified as individual values of the parameters. Changes to specific values may be referred to as data state changes. The data state change may refer to a change of a value of a parameter to a specific value from an other value (and/or from a state of being unspecified). For example, a trigger event may include an occurrence of a reassignment of a unit of work from one user to another specific user. For example, a trigger event may include a comment having one or more specific words and/or phrases.

By way of non-limiting illustration, the trigger events may include specification of the values of the stage parameter for the individual ones of the work unit records and/or other values of other parameters. For example, a trigger event may include specification of a given stage value of the stage parameter corresponding to a given stage. Trigger events may correspond to different stages. In some implementations, a trigger event may include specification of a stage value of the stage parameter in a transition state.

By way of non-limiting illustration, the trigger events include change in the values of the stage parameter for the individual ones of the work unit records and/or other values of other records. For example, a given trigger event may include the change in a value of the stage parameter to and/or from a given stage value. Another trigger event may include a change in the value of the stage parameter to and/or from another given stage value.

In some implementations, a set of automated actions may be associated with one or more of a sequence in which automated actions in the set are to be carried out, concurrent carrying out of two or more of the automated actions in the set, and/or other features and/or functionality. The automated actions within a set of automated actions may have a specified ordered sequence in which the automated actions are to be carried out. In some implementations, one or more actions may be followed by, and/or preceded by, a specified waiting period. A set of automation actions may specify that two or more actions may be carried out concurrently. In some implementations, a user may specify a combination and/or sequence of multiple triggers and/or multiple automated actions that may include branching logic.

In some implementations, individual sets of automated actions and associated individual trigger events may be stored in individual automation records within the automation information. An automation record may define one or more of individual actions, individual trigger events, and/or other information. Individual actions may be defined by a target component, an action component, and/or other information. The target component of an automation record may include the parameter (or parameters) to which an action is to be carried out on. The action component of an automation record may define what change is to be made on the parameter (or parameters) defined by the target component.

Individual trigger events may be defined by a source component, an event component, and/or other information. The source component of an automation record may include the parameter (or parameters) from which occurrences of a trigger event may be derived. The event component may include the value (or change in the value) for the parameter (or parameters) defined by the source component from which occurrences of a trigger event may be derived.

In some implementations, individual automation records may store counts of occurrences of individual trigger events and/or occurrences of carrying out individual automation actions in the sets of automation actions.

It is noted that while some descriptions presented herein may be directed to an individual trigger event causing an individual set of automated actions to be carried out within the collaboration environment, this is for illustrative purposes only and not to be considered limiting. For example, in some implementations, multiple trigger events may be combined together through some logic criteria, that when satisfied, may cause an individual set of automated actions to be carried out within the collaboration environment. Logic may include, for example, Boolean logic. By way of non-limiting illustration, logic operators such as "AND", "OR", "NOT", and/or other operations may be utilized to generate more complex trigger combinations for sets of automated actions. In some implementations, the use of logic operators may allow for fewer discrete trigger events to be defined yet still have more complex behavior available to users. For example, there may not need to specify a trigger event of "when task is unassigned", since through the use of a logic operator "NOT", a trigger event may be defined by "when task assigned" combined with the operator "NOT". Further, the Boolean logic may facilitate multistage automation. By way of non-limiting illustration, instead of input "than-if-then" or "if-and-if-then", logic may include "if-then-then" and/or other operators. In some implementations, a user may specify a set, or pool, of trigger events to trigger one or more automated actions. In some implementations, user may specify that one or more of the trigger events in the set may individually and/or in combination trigger the one or more automated actions. This way, a user may specify multiple options of trigger events which may trigger one or more automated actions. Further, an individual trigger event may trigger multiple automated actions.

The workflow component 112 may be configured to characterize a stage of a work unit record by effectuating change in, or specification of, a stage value of a stage parameter of the record. In some implementations, transitioning may be accomplished by changing the stage value from a value corresponding to one stage to a value corresponding to a next stage. While in transition, a stage value may specify the transition state.

The workflow component 112 may be configured to select, based on the workflow information and/or other information, the rules that apply to the individual ones of the work unit records at the individual stages. The workflow component 112 may be configured to apply the selected rules. In some implementations, the selection and application of rules may be responsive to individual records being at individual stages (or transition states). By way of non-limiting illustration, responsive to the individual ones of the work unit records being at the individual stages, and based on the workflow information, workflow component 112 may be configured to select the rules that apply to the individual ones of the work unit records at the individual stages (and/or transition states), and/or apply those rules.

In some implementations, selecting progress rules may include accessing the sets of progress criteria stored in the criteria information. In some implementations, applying progress rules may include monitoring the environment state information managed by environment state component 108 and/or other information for fulfillment of individual progress criterion. The workflow component 112 may be configured to determine whether progress criterion are fulfilled/met based on the monitoring. The workflow component 112 may be configured to, responsive to the sets of progress criteria being met, transition the individual ones of the work unit records through the stages of the workflows in accordance with the user-defined orders by changing the values of the stage parameter.

In some implementations, selecting automation rules may include accessing automation records. In some implementations, applying automation rules may include monitoring the environment state information managed by environment state component 108 and/or other information for occurrence of trigger events. The workflow component 112 may be configured to detect occurrence of the trigger events based on the monitoring. The workflow component 112 may be configured to, responsive to the detection of the occurrence of individual trigger events, effectuate individual sets of automated actions within the collaboration environment in accordance with currently applied ones of the automation rules.

By way of non-limiting illustration, the workflows may include a first workflow, and/or other workflows. The first workflow may comprise one or more of a first set of stages, first progression information, first rule information, and/or other information. The first set of stages may include one or more of a first stage, a second stage, and/or other stages. The first stage may be associated with a first stage value of the stage parameter. For example, the first stage value may identify the first stage and/or convey that a record is within the first stage. The second stage may be associated with a second stage value of the stage parameter. For example, the second stage value may identify the second stage and/or convey that a record is within the second stage.

The first progression information may specify a first user-defined order in which the individual ones of the work unit records progress through the first set of stages. By way of non-limiting illustration, the first user-defined order may define progress from the first stage to the second stage.

The first rule information may include one or more of first rules that apply to the individual ones of the work unit records at the first stage, second rules that apply to the individual ones of the work unit records at the second stage, and/or other rules. The first rules may include first progress rules and first automation rules. The first progress rules may include first criteria that must be met in order for the individual ones of the work unit records to progress from the first stage to the second stage. The first automation rules may include one or more of a first set of automated actions to carry out in response to a first trigger event, a second set of automated actions to carry out in response to a second trigger event, and/or other rules.

Responsive to a first work unit record being at the first stage, workflow component 112 may be configured to select and apply the first rules to the first work unit record. Responsive to the first criteria being met, workflow component 112 may be configured to transition the first work unit record from the first stage to the second stage by changing the value of the stage parameter of the first work unit record from the first stage value to the second stage value. Responsive to the first work unit record progressing from the first stage to the second stage, workflow component 112 may be configured to select and apply the second rules to the first work unit record.

In some implementations, environment state information may be continually monitored and/or updated as users interact with the collaboration environment over time. The environment state component 108 may store and/or archive the environment state information continuously, periodically, and/or based on user request to archive. The stored and/or archived environment state information may be referred to as historical environment state information and/or other information.

In some implementations, user interface component 110 may be configured to effectuate presentation of instances of a user interface of the collaboration environment through which users access workflows. The user interface may include one or more user interface portions. The user interface may include one or more user interface elements configured to facilitate user interaction with the user interface. By way of non-limiting illustration, user interface elements may include one or more of text input fields, drop-down menus, check boxes, display windows, virtual buttons, icons, graphics, and/or other elements configured to facilitate user interaction.

Workflows may be configured such that the underlying work unit records may be directly connected to the workflows. That way, users can seamlessly go between views of the workflow and the work itself (e.g., pages of work unit records). The pages of the work unit records may provide access to the values of the work unit parameters. By way of non-limiting illustration, the pages may include individual user interface elements displaying individual stage values of the stage parameter if the work unit records are linked to one or more workflows. The individual user interface elements displaying stage values and/or other values may be selectable within the pages. Selection of a user interface element displaying a stage value may effectuate presentation of corresponding ones of the workflows.

The user interface component 110 may be configured to obtain user input information conveying user input into the user interface. Responsive to obtaining user input information conveying selection of individual user interface elements displaying stage values, user interface component 110 effectuate presentation of the corresponding ones of the workflows within the user interface.

A workflow may be visually represented in the user interface in a way that conveys the organization of stages, their connectedness, and applicable rules. For example, a workflow may be presented as an interactable flow chart, with user interface elements representing stages, and arrows or other connectors between those user interface elements representing the order of flow from one stage to another. The user interface elements representing stages may visually contain other user interface elements representing work unit records currently in the individual stages. For example, user interface elements representing work unit records may include graphical icons that display the title or other information from the records for quick reference. Selection of an icon may cause a page for a corresponding record to be presented, for example, in a pop-up window or other display. Rules for the individual stages may be visually represented by a textual listing of rules, and/or through presentation of other icons representing the rules. Icons representing rules may be selectable to present a window displaying the details of the rules.

In some implementations, a workflow may include an "intake stage." An intake stage may correspond to a beginning of a workflow. An intake stage may occur temporally first, prior to other stages. The intake stage may act as an information stage rather than behave like other stages described herein. By way of non-limiting illustration, the intake stage may be "positioned" at the beginning of the workflow. At the start of a workflow, the intake stage may be initiated and may cause a user interface to display information about the different ways that work unit records are entering and/or exiting the workflow and/or individual stages within the workflow. By way of non-limiting illustration, the intake stage may include an explanation of one or more rules that apply to one or more stages. Users may get a preview about the innerworkings of the workflow, how it functions, who created it, etc.

In some implementations, user interface component 110 may be configured to effectuate presentation of instances of a user interface of the collaboration environment through which users create workflows. In some implementations, creation of a workflow may be based on user interactions with a workflow template. A workflow template may include the same or similar elements as a workflow described above, however with the user interface elements being left as generic placeholders (e.g., not linked to any particular work unit record and/or rule). In some implementations, the user interface elements may include instructions on user interaction with the template to create the workflow. For example, a placeholder user interface element representing a work unit record may include a text input field instructions to type in a work unit record title to identify a work unit record, or to drag and drop an icon representing a record. By typing in the title or performing drag-and-drop, a work unit record may be identified and linked to a stage. The user interface elements representing rules may be similarly interacted with such that a user may specify the rules they want associated with each stage and/or for each work unit record at the stage. The quantity and ordering of the user interface elements representing stages may be specifically set by the user, by adding or deleting as needed.

In some implementations, workflow component 112 may be configured to identify and/or infer a workflow that one or more users may be carrying out. By way of non-limiting illustration, users may simply start and continue their work without any specific connection to a user-defined workflow. The workflow component 112 may be configured to infer that the user is following a workflow.

The workflow component 112 may be configured to determine individual sets of repeated user actions by the individual users. The determination may be based on monitoring environment state information (e.g., change in values of parameters and/or other monitoring), user actions, and/or other components of system 100. In some implementations, determining individual sets of repeated user actions by the individual users may include determining one or more actions and/or events occurring within the collaboration environment which precede the individual sets of repeated user actions. The one or more actions and/or events occurring within the collaboration environment which precede the individual sets of repeated user actions may be determined as criteria and/or trigger events. In some implementations, a set of user actions may be deemed "repeated" after the set of user actions occur more than once.

By way of non-limiting illustration, environment state component 108 may be configured to continuously monitor the environment state information to detect and/or determine how the users are working. By way of non-limiting illustration, a user may repeat sets of user interactions in the collaboration environment that may be indicative of the user following an organized and repeatable work process. Based on the monitoring by the environment state component 108, workflow component 112 may be configured to infer that the user is following a workflow. In this manner, a workflow may be materialized based on what happened/is happening in connection to the user's work, without explicit definition of a workflow. In some implementations, workflow component 112 may utilize one or more of heuristics, machine learning, AI, and/or other techniques to infer that a user is following a workflow based on continuous monitoring of environment state information.

In some implementations, workflow component 112 may be configured to generate recommendations for one or more workflows based on inferring that a user is following a workflow. A recommendation may be for a pre-existing workflow that follows the same or similar patterns, and/or may be for a newly generated workflow based on the monitoring. A recommendation may be for one or more of a workflow as a whole, individual stages, and/or components thereof. By way of non-limiting illustration, a recommendation may be for one or more of a single stage, rules that should apply for that stage, inclusion of records within one or more stages, rules that should apply to one or more records, criteria to move into and/or out of that stage, and/or other workflow-related content. A recommendation may include automation rules within a workflow that automate some of the user's actions (e.g., repeated actions, tedious actions, etc.).

The workflow component 112 may be configured to recommend that a record be added to a workflow. By way of non-limiting illustration, workflow component 112 may be configured to detect, based on monitoring of environment state information, that a record is interacted within in relation to other interactions of one or more other records that are within a workflow. For example, monitoring of the environment state information may detect that the record is acting on or with the one or more other records (e.g., is impacting and/or is being impacted by). The record may be recommended to be added to the workflow.

It is noted that while although a workflow has been described herein with respect to forward progress through an ordered series of stages, this is for illustrative purposes only. In some implementations, records may flow backward through a workflow. As a work moves through a workflow, the work may change. By way of non-limiting illustration, a task for a superior to review the work of a subordinate may be rejected by the superior, such that the task may move backward so the subordinate can readdress the work and make changes as needed. In some implementations, a workflow may be configured with specific rules that address instances when work is marked as "rejected," "revisions required," and/or "incomplete." In some implementations, when work is marked as "rejected," "revisions required," "incomplete," workflow component 112 may be configured to automatically implement template tasks to facilitate a backwards flow in a workflow.

In some implementations, based on the monitoring by the environment state component 108, workflow component 112 may be configured determine if a user is not following a workflow. For example, workflow component 112 may be configured to compare the environment state information to an individual workflow (and/or the environment state information that would be expected if the individual workflow was followed). By way of non-limiting illustration of not following a workflow, a user may manually specify that a record is at a stage prior to progress criteria being met. Determining a user is not following a workflow may be accomplished in other ways. In some implementations, in response to determining a user is not following a workflow, user interface component 110 may be configured to effectuate presentation of one or more notifications. A notification may be a pop-up notification, for example. The notification may include one or more of an identification of a workflow, a notice/warning that the user is not following a workflow, a description of user action that prompted a determination they were not following the workflow, an indication of a creator of the workflow (since the user may want to contact them about potential changes, steps the user can take to get back on track with the workflow, and/or other information.

Figure 3:
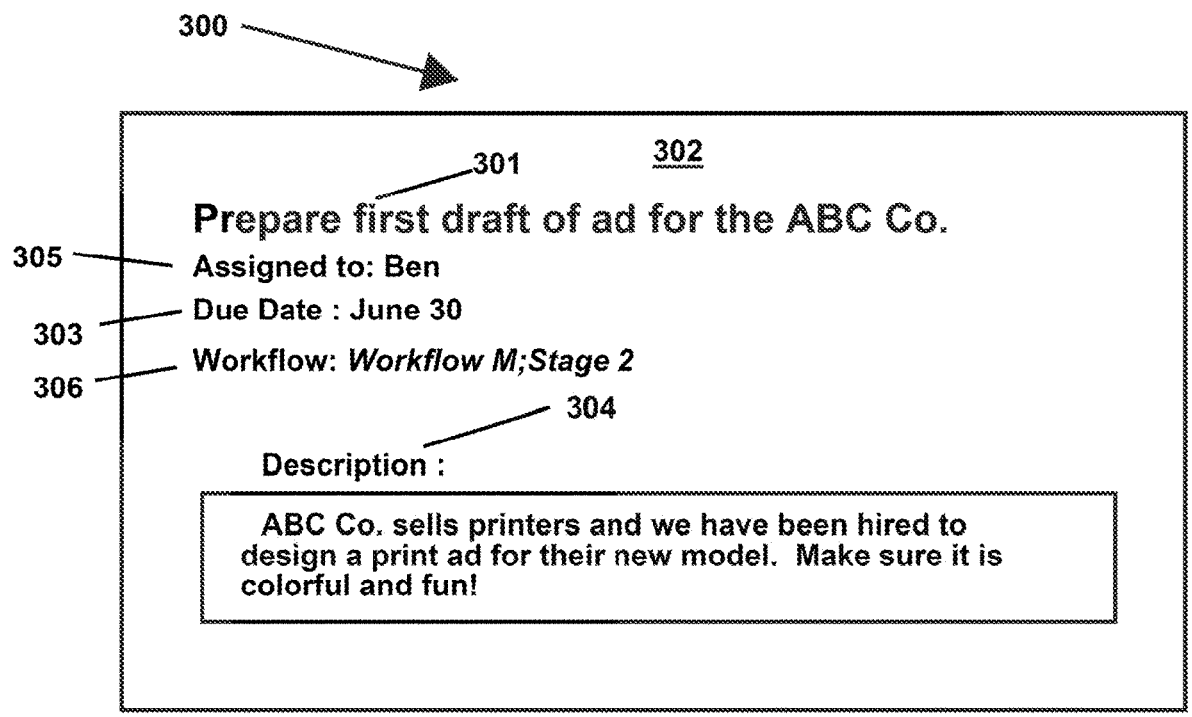
FIG. 3 illustrates a user interface, in accordance with one or more implementations.

FIG. 3 illustrates a user interface 300 of a collaboration environment, in accordance with one or more implementations. The user interface 300 may include a view of a collaboration environment. In particular, the user interface 300 may comprise a work unit page 302 for work unit record defining a unit of work 301. The user interface 300 may display values of one or more work unit parameters, and/or other information. By way of non-limiting illustration, a user interface element 301 may display a current title of the unit of work 301. A user interface element 303 may display a due date of unit of work 301. A user interface element 305 may display an assignee of unit of work 301. A user interface element 304 may display a description of the unit of work 301. A user interface element 306 may display a stage value of a stage parameter. By way of non-limiting illustration, the stage value may identify a workflow and/or a current stage of the unit of work 301 within the workflow. For illustrative purposes, the workflow is "Workflow M," and the current stage is "stage 2." Selection of user interface element 306 may effectuate presentation of a view of Workflow M (see, e.g., FIG. 4).

Figure 4:
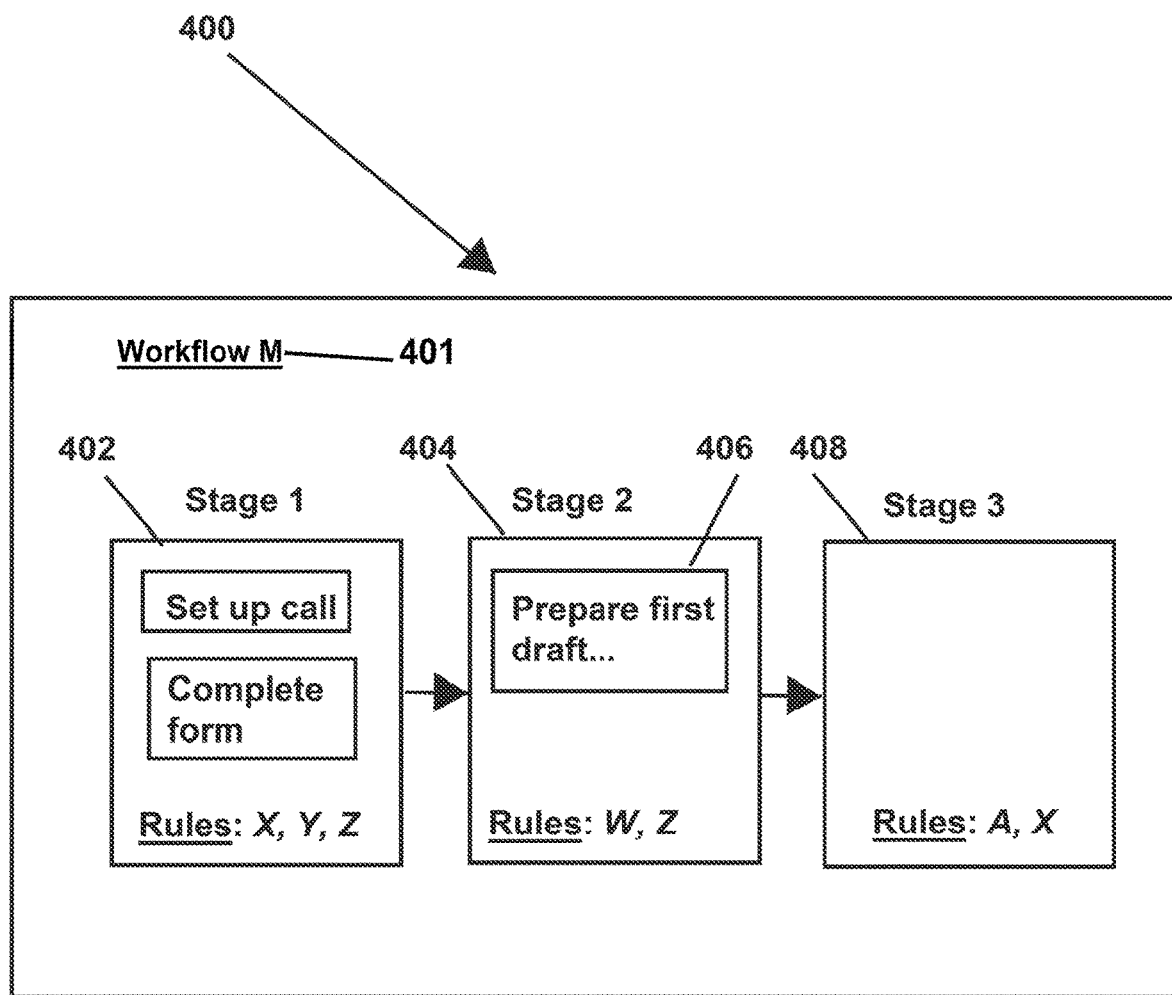
FIG. 4 illustrates a user interface, in accordance with one or more implementations.

FIG. 4 illustrates a user interface 400, in accordance with one or more implementations. The user interface 400 may include a view of Workflow M 401. Workflow M 401 may be include a set of stages, including a Stage 1, followed by Stage 2, followed by Stage 3. The stages may be represented by user interface elements 402, 404, and 408, respectively. The user interface elements 402, 404, and 408 representing the stages may visually contain other user interface elements representing work unit records currently in the individual stages, and user interface elements representing rules that apply at the stages. By way of non-limiting illustration, element 402 for Stage 1 may include a set of icons representing work unit records for units of work for "Set up call" and "Complete form." The rules may be represented by a listing of rules that apply, for example, rules "X," "Y" and "Z" for Stage 1; rules "W" and "Z" for Stage 2; and rules "A" and X" for Stage 3. The element 404 for Stage 2 may include an element 406 representing the work unit record for the unit of work 301 in FIG. 3. Selection of element 406 may cause presentation of the work unit page 302 as shown in FIG. 3. Selection of other elements may cause presentation of corresponding work unit pages. As shown, unit of work 301, as represented by element 406, is in Stage 2. This may mean that unit of work 301 transitioned from Stage 1 to Stage 2, or was created in Stage 2. The unit of work 301, as represented by element 406, may transition from Stage 2 to Stage 3 upon satisfaction of progress criteria. Upon transition, element 406 may move from element 404 to element 408. For illustrative purposes, criteria to transition to Stage 3 may include completing unit of work 301. One or more rules associated with Stage 3 may subsequently cause unit of work 301 to be marked in complete, reassigned to another user, renamed, and/or be changed in other ways. Although not explicitly shown, if or when all work for a stage is complete, the user interface elements or text may be grayed out, removed, or modified in other ways to convey completion of the given stage.

Referring back to FIG. 1, in some implementations, server(s) 102, client computing platform(s) 104, and/or external resources 126 may be operatively linked via one or more electronic communication links. For example, such electronic communication links may be established, at least in part, via a network 116 such as the Internet and/or other networks. It will be appreciated that this is not intended to be limiting, and that the scope of this disclosure includes implementations in which server(s) 102, client computing platform(s) 104, and/or external resource(s) 126 may be operatively linked via some other communication media.

A given client computing platform may include one or more processors configured to execute computer program components. The computer program components may be configured to enable an expert or user associated with the given client computing platform to interface with system 100 and/or external resource(s) 126, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resource(s) 126 may include sources of information outside of system 100, external entities participating with system 100, and/or other resources. In some implementations, some or all of the functionality attributed herein to external resource(s) 126 may be provided by resources included in system 100.

Server(s) 102 may include electronic storage 128, one or more processors 130, and/or other components. Server(s) 102 may include communication lines, or ports to enable the exchange of information with a network 116 and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 128 may comprise non-transitory storage media that electronically stores information. The electronic storage media of electronic storage 128 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, and/or other information that enables server(s) 102 to function as described herein.

Processor(s) 130 may be configured to provide information processing capabilities in server(s) 102. As such, processor(s) 130 may include one or more of a digital processor, a physical processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components 108, 110, 112, and/or other components. Processor(s) 130 may be configured to execute components 108, 110, 112, and/or other components by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, and/or 112 are illustrated in FIG. 1 as being implemented within a single processing unit, in implementations in which processor(s) 130 includes multiple processing units, one or more of components 108, 110, and/or 112 may be implemented remotely from the other components. The description of the functionality provided by the different components 108, 110, and/or 112 described below is for illustrative purposes, and is not intended to be limiting, as any of components 108, 110, and/or 112 may provide more or less functionality than is described. For example, one or more of components 108, 110, and/or 112 may be eliminated, and some or all of its functionality may be provided by other ones of components 108, 110, and/or 112. As another example, processor(s) 130 may be configured to execute one or more additional components that may perform some or all of the functionality attributed below to one of components 108, 110, and/or 112.

Figure 2:
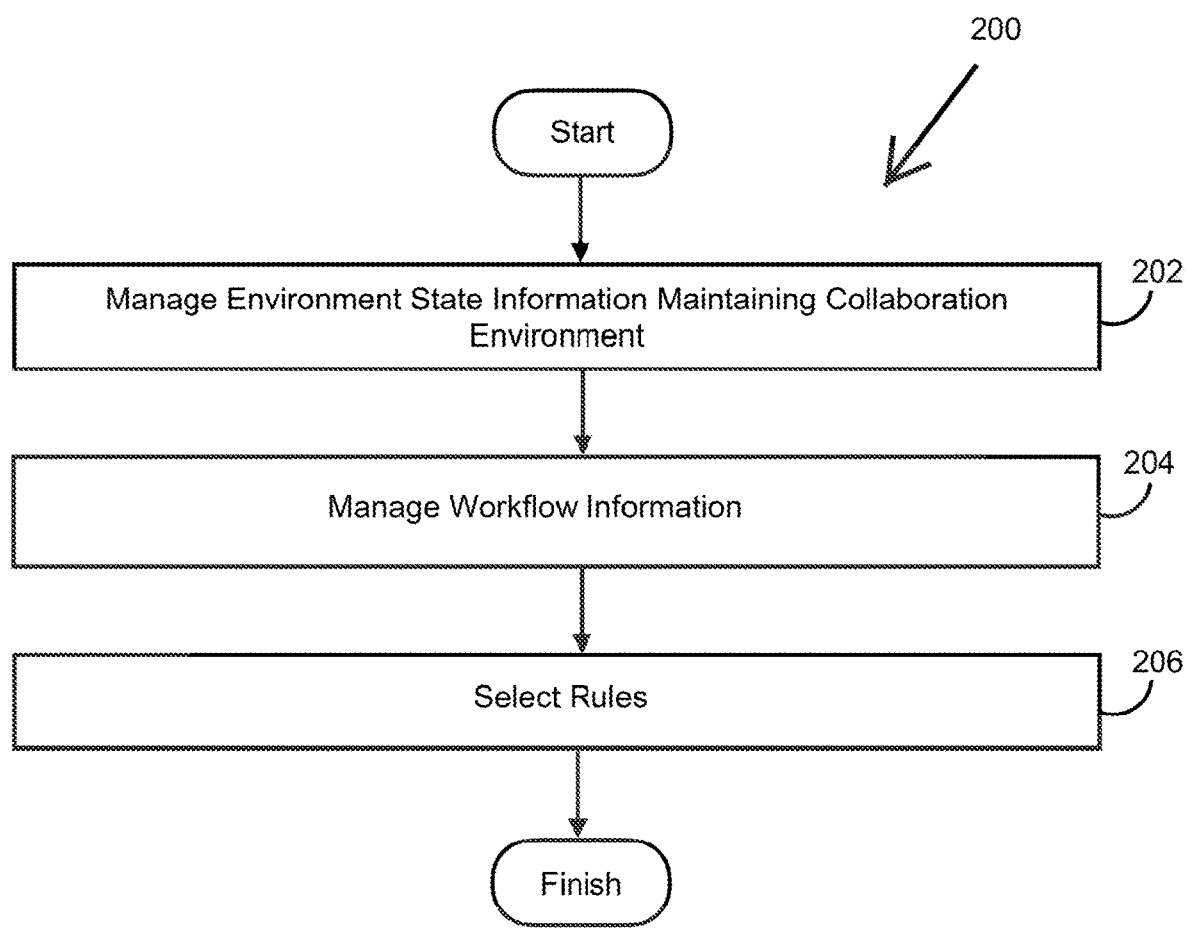
FIG. 2 illustrates a method to characterize work unit records of a collaboration environment based on stages within a workflow, in accordance with one or more implementations.

FIG. 2 illustrates a method 200 to characterize work unit records of a collaboration environment based on stages within a workflow, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may manage environment state information maintaining a collaboration environment. The collaboration environment may be configured to facilitate interaction by users with the collaboration environment. The environment state information may include work unit records for units of work managed, created, and/or assigned within the collaboration environment. The work unit records may specify values of work unit parameters characterizing the units of work. The work unit parameters may include a stage parameter characterizing stage of individual ones of the units of work within workflows. The workflows may comprise sets of stages through which individual ones of the work unit records progress. Operation 202 may be performed by one or more hardware processors configured by machine-readable instructions including a component that is the same as or similar to environment state component 108, in accordance with one or more implementations.

An operation 204 may manage workflow information characterizing the workflows. The workflow information may include one or more of progression information, rule information, and/or other information. The progression information may specify user-defined orders in which the individual ones of the work unit records progress through individual ones of the sets of stages. The rule information may include rules that apply to the individual ones of the work unit records at individual stages in the sets of stages. By way of non-limiting illustration, the workflows may include a first workflow and/or other workflows. The first workflow may comprise one or more of a first set of stages, first progression information, first rule information, and/or other information. The first set of stages may include one or more of a first stage associated with a first stage value of the stage parameter, a second stage associated with a second stage value of the stage parameter, and/or other stages. The first progression information may specify a first user-defined order in which the individual ones of the work unit records progress through the first set of stages. The first user-defined order may define, for example, progress from the first stage to the second stage, from the second stage to one or more other stages, and/or other progressions. The first rule information may include one or more of first rules that apply to the individual ones of the work unit records at the first stage, second rules that apply to the individual ones of the work unit records at the second stage, and/or other rules. Operation 204 may be performed by one or more hardware processors configured by machine-readable instructions including a component that is the same as or similar to workflow component 112, in accordance with one or more implementations.

An operation 206 may, responsive to the individual ones of the work unit records being at the individual stages, and based on the workflow information, select the rules that apply to the individual ones of the work unit records at the individual stages. By way of non-limiting illustration, responsive to a first work unit record being at the first stage, operation 206 may select and apply the first rules to the first work unit record. By way of non-limiting illustration, responsive to the first work unit record progressing from the first stage to the second stage, operation 206 may select and apply the second rules to the first work unit record. Operation 206 may be performed by one or more hardware processors configured by machine-readable instructions including a component that is the same as or similar to workflow component 112, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed:

1. A system configured to characterize work unit records of a collaboration environment based on stages within a workflow and provide navigation functionality between graphical user interface pages for the work unit records and a graphical user interface page of the workflow, the system comprising:
one or more physical processors configured by machine-readable instructions to:
manage, by a server, environment state information maintaining a collaboration environment, the collaboration environment being configured to facilitate interaction by users with the collaboration environment, the users interacting with the collaboration environment via remotely located client computing platforms communicating with the server over one or more network connections, the environment state information including work unit records for units of work managed, created, and/or assigned within the collaboration environment, the work unit records specifying values of work unit parameters characterizing the units of work, the work unit parameters including a stage parameter characterizing stage of individual ones of the units of work within workflows, the workflows comprising sets of stages through which individual ones of the work unit records progress;
manage, by the server, workflow information characterizing the workflows, the workflow information including progression information and rule information, the progression information specifying user-defined orders in which the individual ones of the work unit records progress through individual ones of the sets of stages, the rule information including rules that apply to the individual ones of the work unit records at individual stages in the sets of stages, the workflows including a first workflow comprising:
a first set of stages, the first set of stages including a first stage associated with a first stage value of the stage parameter, and a second stage associated with a second stage value of the stage parameter;
first progression information specifying a first user-defined order in which the individual ones of the work unit records progress through the first set of stages, the first user-defined order defining progress from the first stage to the second stage; and
first rule information including first rules that apply to the individual ones of the work unit records at the first stage, and second rules that apply to the individual ones of the work unit records at the second stage;
establish the one or more network connections between the remotely located client computing platforms and the server;
effectuate communication of user interface information from the server to the remotely located client computing platforms over the one or more network connections to cause the remotely located client computing platforms to present graphical user interface work pages for the work unit records within a graphical user interface of the collaboration environment, individual ones of the graphical user interface work pages corresponding to individual ones of the work unit records, the individual ones of the graphical user interface work pages providing access to the values of the work unit parameters, such that the individual ones of the graphical user interface work pages include individual user interface elements displaying individual stage values of the stage parameter of the individual ones of the work unit records, wherein the individual user interface elements are selectable to cause the graphical user interface to navigate from the individual ones of the graphical user interface work pages to individual graphical user interface workflow pages through which the users access views of corresponding ones of the workflows;
responsive to obtaining user input information conveying user input into the graphical user interface including selection of the individual user interface elements, cause the graphical user interface to navigate from the individual ones of the graphical user interface work pages to the individual graphical user interface workflow pages through which the users access the views of the corresponding ones of the workflows within the graphical user interface; and
responsive to the individual ones of the work unit records being at the individual stages, and based on the workflow information, select, by the server, the rules that apply to the individual ones of the work unit records at the individual stages, such that:
responsive to a first work unit record being at the first stage, select and apply the first rules to the first work unit record; and
responsive to the first work unit record progressing from the first stage to the second stage, select and apply the second rules to the first work unit record.

2. The system of claim 1, wherein the rule information includes criteria information and automation information, the criteria information including progress rules that specify sets of progress criteria that must be met in order for the individual ones of the work unit records to progress from one stage to another, the automation information including automation rules that specify sets of automated actions to carry out within the collaboration environment in response to trigger events, such that the first rule information includes:
    first criteria that must be met in order for the individual ones of the work unit records to progress from the first stage to the second stage;
    a first set of automated actions to carry out in response to a first trigger event; and
    a second set of automated actions to carry out in response to a second trigger event.

3. The system of claim 2, wherein the trigger events include specification of the values of the stage parameter for the individual ones of the work unit records, such that the first trigger event includes specification of the first stage value of the stage parameter, and the second trigger event includes specification of the second stage value of the stage parameter.

4. The system of claim 2, wherein the trigger events include change in the values of the stage parameter for the individual ones of the work unit records, such that the first trigger event includes the change in a value of the stage parameter to and/or from the first stage value, and the second trigger event includes the change in the value of the stage parameter to and/or from the second stage value.

5. The system of claim 2, wherein automated actions include one or more of creating new ones of the work unit records, specifying user assignments to the units of work, specifying due dates of the units of work, completing one or more of the units of work, causing progress of other ones of the work unit records through other ones of the workflows, or sending communications to one or more of the users.

6. The system of claim 2, wherein progress criteria includes one or more of completing one or more of the units of work, uploading a digital content item, or communicating with one or more of the users.

7. The system of claim 2, wherein the one or more physical processors are further configured by the machine-readable instructions to:
    responsive to the sets of progress criteria being met, transition the individual ones of the work unit records through stages of the workflows in accordance with the user-defined orders by changing the values of the stage parameter, such that responsive to the first criteria being met, transition the first work unit record from the first stage to the second stage by changing the value of the stage parameter of the first work unit record from the first stage value to the second stage value.

8. The system of claim 1, wherein the one or more physical processors are further configured by the machine-readable instructions to:
    determine whether the individual ones of the work unit records are at individual transition states between the individual stages; and
    responsive to the individual ones of the work unit records being at the individual transition states, select the rules that apply to the individual ones of the work unit records at the individual transition states.

9. A method to characterize work unit records of a collaboration environment based on stages within a workflow and provide navigation functionality between graphical user interface pages for the work unit records and a graphical user interface page of the workflow, the method being implemented in a computer system comprising one or more physical processors configured by machine-readable instructions, such that execution of the machine-readable instructions by the one or more physical processors causes the one or more physical processors to perform the method comprising:
    managing, by a server, environment state information maintaining a collaboration environment, the collaboration environment being configured to facilitate interaction by users with the collaboration environment, the users interacting with the collaboration environment via remotely located client computing platforms communicating with the server over one or more network connections, the environment state information including work unit records for units of work managed, created, and/or assigned within the collaboration environment, the work unit records specifying values of work unit parameters characterizing the units of work, the work unit parameters including a stage parameter characterizing stage of individual ones of the units of work within workflows, the workflows comprising sets of stages through which individual ones of the work unit records progress;
    managing, by the server, workflow information characterizing the workflows, the workflow information including progression information and rule information, the progression information specifying user-defined orders in which the individual ones of the work unit records progress through individual ones of the sets of stages, the rule information including rules that apply to the individual ones of the work unit records at individual stages in the sets of stages, the workflows including a first workflow comprising:
        a first set of stages, the first set of stages including a first stage associated with a first stage value of the stage parameter, and a second stage associated with a second stage value of the stage parameter;
        first progression information specifying a first user-defined order in which the individual ones of the work unit records progress through the first set of stages, the first user-defined order defining progress from the first stage to the second stage; and
        first rule information including first rules that apply to the individual ones of the work unit records at the first stage, and second rules that apply to the individual ones of the work unit records at the second stage;
    establishing the one or more network connections between the remotely located client computing platforms and the server;
    effectuating communication of user interface information from the server to the remotely located client computing platforms over the one or more network connections to cause the remotely located client computing platforms to present graphical user interface work pages for the work unit records within a graphical user interface of the collaboration environment, individual ones of the graphical user interface work pages corresponding to individual ones of the work unit records, the individual ones of the graphical user interface work pages providing access to the values of the work unit parameters, such that the individual ones of the graphical user interface work pages include individual user interface elements displaying individual stage values of the stage parameter of the individual ones of the work unit records, wherein the individual user interface elements are selectable to cause the graphical user interface to navigate from the individual ones of the graphical user interface work pages to individual graphical user interface workflow pages through which the users access views of corresponding ones of the workflows;

responsive to obtaining user input information conveying user input into the graphical user interface including selection of the individual user interface elements, causing the graphical user interface to navigate from the individual ones of the graphical user interface work pages to the individual graphical user interface workflow pages through which the users access the views of the corresponding ones of the workflows within the graphical user interface; and responsive to the individual ones of the work unit records being at the individual stages, and based on the workflow information, selecting, by the server, the rules that apply to the individual ones of the work unit records at the individual stages, such that:

responsive to a first work unit record being at the first stage, selecting and applying the first rules to the first work unit record; and responsive to the first work unit record progressing from the first stage to the second stage, selecting and applying the second rules to the first work unit record.

10. The method of claim 9, wherein the rule information includes criteria information and automation information, the criteria information including progress rules that specify sets of progress criteria that must be met in order for the individual ones of the work unit records to progress from one stage to another, the automation information including automation rules that specify sets of automated actions to carry out within the collaboration environment in response to trigger events, such that the first rule information includes:

first criteria that must be met in order for the individual ones of the work unit records to progress from the first stage to the second stage;

a first set of automated actions to carry out in response to a first trigger event; and a second set of automated actions to carry out in response to a second trigger event.

11. The method of claim 10, wherein the trigger events include specification of the values of the stage parameter for the individual ones of the work unit records, such that the first trigger event includes specification of the first stage value of the stage parameter, and the second trigger event includes specification of the second stage value of the stage parameter.

12. The method of claim 10, wherein the trigger events include change in the values of the stage parameter for the individual ones of the work unit records, such that the first trigger event includes the change in a value of the stage parameter to and/or from the first stage value, and the second trigger event includes the change in the value of the stage parameter to and/or from the second stage value.

13. The method of claim 10, wherein automated actions include one or more of creating new ones of the work unit records, specifying user assignments to the units of work, specifying due dates of the units of work, completing one or more of the units of work, causing progress of other ones of the work unit records through other ones of the workflows, or sending communications to one or more of the users.

14. The method of claim 10, wherein progress criteria includes one or more of completing one or more of the units of work, uploading a digital content item, or communicating with one or more of the users.

15. The method of claim 10, further comprising:

responsive to the sets of progress criteria being met, transitioning the individual ones of the work unit records through stages of the workflows in accordance with the user-defined orders by changing the values of the stage parameter, including responsive to the first criteria being met, transitioning the first work unit record from the first stage to the second stage by changing the value of the stage parameter of the first work unit record from the first stage value to the second stage value.

16. The method of claim 9, further comprising:

determining whether the individual ones of the work unit records are at individual transition states between the individual stages; and responsive to the individual ones of the work unit records being at the individual transition states, selecting the rules that apply to the individual ones of the work unit records at the individual transition states.

* * * * *